US006335778B1

United States Patent
Kubota et al.

(10) Patent No.: US 6,335,778 B1
(45) Date of Patent: Jan. 1, 2002

(54) ACTIVE MATRIX TYPE LIQUID CRYSTAL DISPLAY DEVICE USING DRIVER CIRCUITS WHICH LATCH-IN DATA DURING HORIZONTAL BLANKING PERIOD

(75) Inventors: Yasushi Kubota, Sakurai; Ichiro Shiraki; Tamotsu Sakai, both of Tenri, all of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 08/901,649

(22) Filed: Jul. 28, 1997

(30) Foreign Application Priority Data

Aug. 28, 1996 (JP) .............................................. 8-226378

(51) Int. Cl.[7] ........................... G02F 1/1345; G09G 3/36
(52) U.S. Cl. .......................................... 349/151; 345/98
(58) Field of Search ..................... 349/27, 151; 345/92, 345/90, 96, 98, 160

(56) References Cited

U.S. PATENT DOCUMENTS

| | | | | |
|---|---|---|---|---|
| 5,121,235 A | * | 6/1992 | Matino et al. ................. | 349/85 |
| 5,208,689 A | * | 5/1993 | Hartmann et al. ........... | 349/144 |
| 5,247,375 A | * | 9/1993 | Mochizuki et al. ............ | 349/84 |
| 5,296,870 A | * | 3/1994 | Nicholas ....................... | 345/89 |
| 5,331,447 A | * | 7/1994 | Someya et al. ............... | 349/54 |
| 5,436,747 A | * | 7/1995 | Suzuki ......................... | 349/42 |
| 5,491,347 A | * | 2/1996 | Allen et al. .................... | 257/59 |
| 5,666,173 A | * | 9/1997 | Mase et al. .................... | 349/61 |
| 5,701,167 A | * | 12/1997 | Yamazaki ..................... | 349/42 |
| 5,822,028 A | * | 10/1998 | Miyawaki ................... | 349/111 |
| 5,852,425 A | * | 12/1998 | Bird et al. ..................... | 345/92 |
| 5,905,482 A | * | 5/1999 | Hughes et al. ................ | 345/89 |
| 5,920,299 A | * | 7/1999 | Oshima et al. ............... | 345/89 |
| 6,040,812 A | * | 3/2000 | Lewis .......................... | 349/89 |

FOREIGN PATENT DOCUMENTS

| | | |
|---|---|---|
| JP | 2-184821 | 7/1990 |
| JP | 6-324306 | 11/1994 |
| JP | 6-079413 | * 1/1995 |
| JP | 7-261155 | 10/1995 |

OTHER PUBLICATIONS

A 6.3 Mpixel AMLCD, Martin et al, SID 1993 DIG, May 1993.*
Ferroelectric Liquid–Crystal Shutter Array with Poly–Si TFT Driver, Okumura et al , SID 89 DIG, May 1989.*
Polysilicon TFT Active Matrix LCD Drivers, Lewis et al, SID 91 DIG, May 1991.*
A 1.9 in 1.5 MPixel Driver Fully–INtegrated Poly–Si TFT–LCD for HDTV projection, Takafuji et al, SID 93 DIG, May 1993.*
Polysilicon active–matrix liquid crystal displays, Faughnan et al, Information display, Oct. 1989.*

* cited by examiner

Primary Examiner—Kenneth Parker
(74) Attorney, Agent, or Firm—Nixon & Vanderhye P.C.

(57) ABSTRACT

An active matrix type liquid crystal display device carries out half-tone display with an area gray scale display method, according to which a pixel is composed of a plurality of subpixels and the area of display regions is changed by an image signal that is a binary signal. The amplitude of an opposite electrode is optimized by configuring a data signal line driving circuit with a scanning circuit, latch-in circuits and outputting circuits. This eliminates the needs to externally input an analogue signal and an intermediate voltage, and enables the driving circuit to be configured only with digital circuits. The driving circuit is integrated to prevent increases in cost of the driving circuit and of mounting the driving circuit that are caused by an increase in the number of data signal lines as a result of the adoption of the area gray scale display method. Consequently, it becomes possible to make an attempt to reduce the cost, power consumption and non-defective ratio of the entire system.

32 Claims, 30 Drawing Sheets

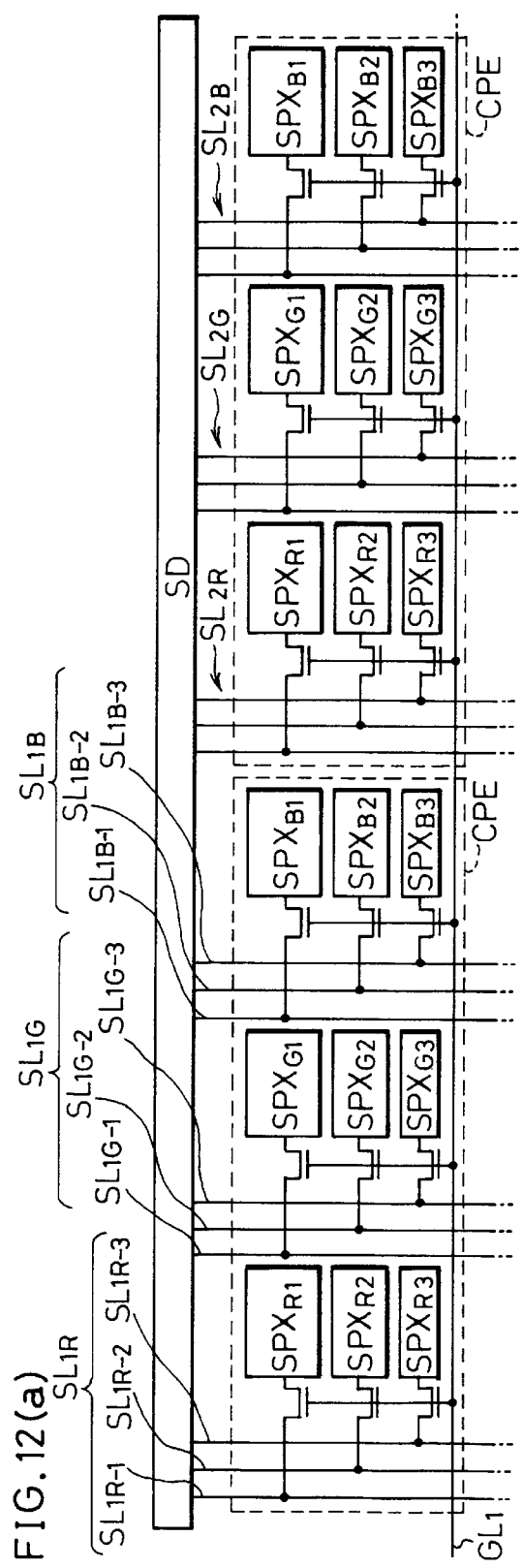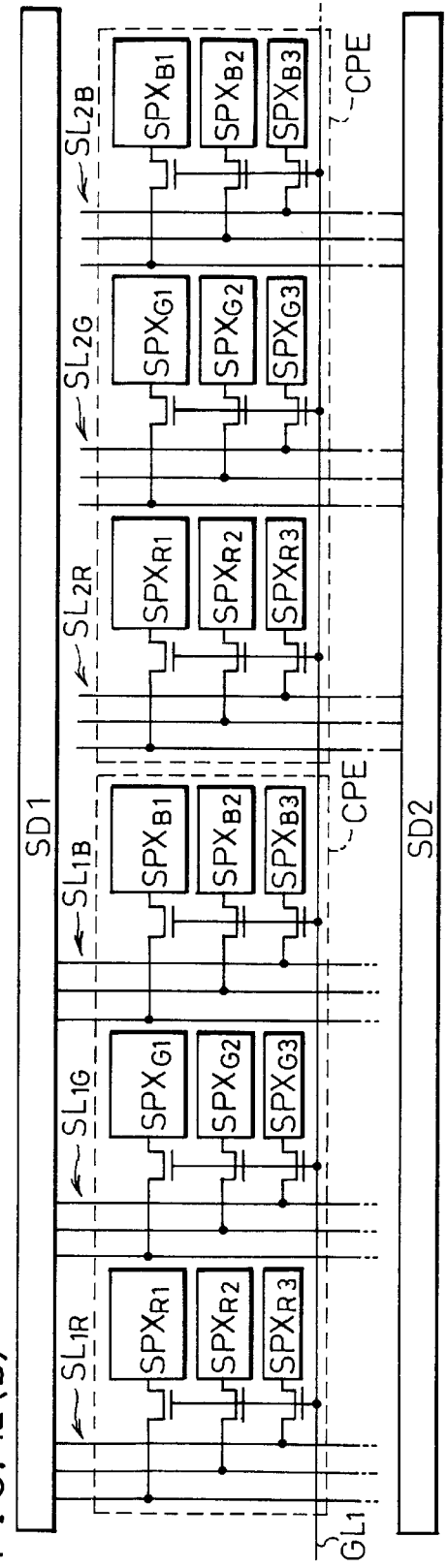

FIG. 23(a)
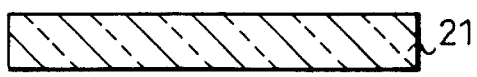
FIG. 23(b)
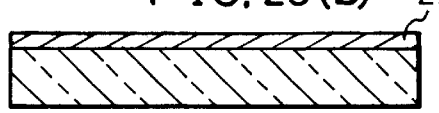
FIG. 23(c) Excimer Laser
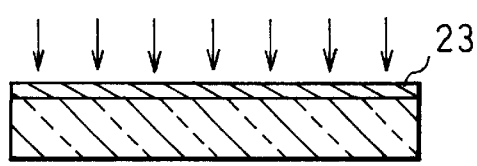
FIG. 23(d)
FIG. 23(e)
FIG. 23(f)
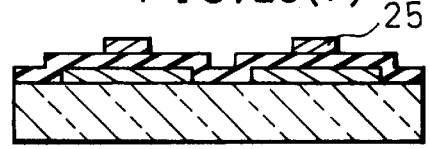
FIG. 23(g) P⁺ion doping
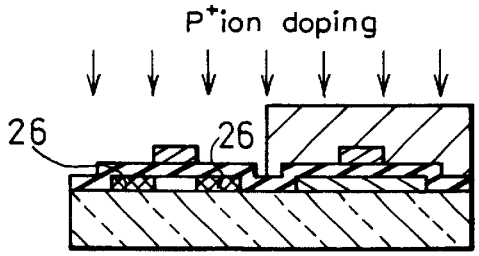
FIG. 23(h) B⁺ion doping
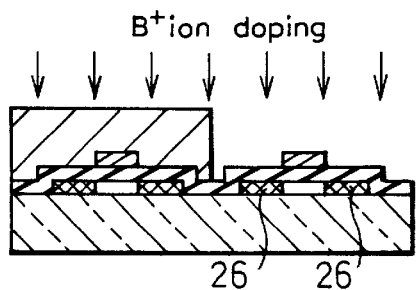
FIG. 23(i)
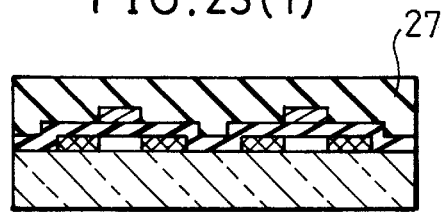
FIG. 23(j)
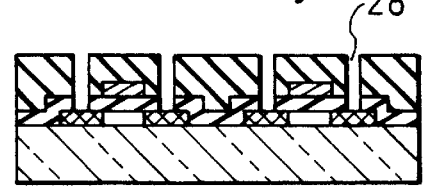
FIG. 23(k)
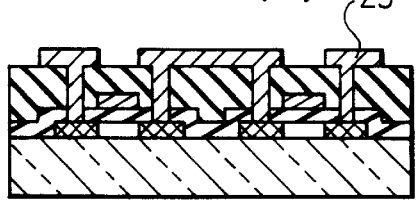

ACTIVE MATRIX TYPE LIQUID CRYSTAL DISPLAY DEVICE USING DRIVER CIRCUITS WHICH LATCH-IN DATA DURING HORIZONTAL BLANKING PERIOD

FIELD OF THE INVENTION

The present invention relates to an active matrix type liquid crystal display device integrated with a driving circuit for displaying images according to inputted digital image signals, and more particularly to a liquid crystal display device that is little affected by non-uniform properties of elements and that is capable of reducing the power consumption and the cost by a large amount by digitally driving all circuits.

BACKGROUND OF THE INVENTION

An active matrix type liquid crystal display device will be taken as an example to illustrate a conventional liquid crystal display device.

As shown in FIG. 24, the liquid crystal display device is composed of a pixel array (ARY), a scanning signal line driving circuit (GD) and a data signal line driving circuit (SD).

The pixel array ARY includes a plurality of scanning signal lines ($GL_1$, $GL_2$ ... ; the signal lines will be inclusively denoted as GLs) and a plurality of data signal lines ($SL_1$, $SL_2$, ... ; the signal lines will be inclusively denoted as SLs) which cross with each other. A pixel (PIX) is provided in each region enclosed by two adjacent scanning signal lines GLs and two adjacent data signal lines SLs to form a matrix as a whole.

The data signal line driving circuit (SD), which is synchronized with a timing signal such as a clock signal (CKS), samples an inputted image signal (DAT), amplifies the image signal DAT as necessary, and writes the image signal DAT into the data signal line SL. The scanning signal line driving circuit GD, which is synchronized with a timing signal such as a clock signal (CKG), sequentially selects one of the scanning signal lines GLs, writes into the pixel PIX an image signal (image data) that has been written into the data signal line SL, and lets the pixel PIX retain the image data written into the pixel PIX, by controlling opening and closing of a switching element in the pixel PIX.

As shown in FIG. 25, the pixel PIX includes a pixel transistor (SW), as a switching element, composed of a field effect transistor and a pixel capacity composed of a liquid crystal capacity (CL) and a supplementary capacity (CS) that is added if necessary.

The data signal line SL is connected to one of two electrodes of the pixel capacity via the drain and source of the pixel transistor SW. The gate of the pixel transistor SW is connected to the scanning signal line GL. The other electrode of the pixel capacity is connected to a common electrode line which is common to all the pixels. The voltage applied to the liquid crystal capacity CL modulates the transmittance or reflectance of the liquid crystal, thereby enabling the liquid crystal to act as a display.

Incidentally, as to the conventional active matrix type liquid crystal display device, an amorphous silicon thin film formed on a transparent substrate such as glass is used as a material of the substrate of the pixel transistor SW, and ICs are externally provided to function as the scanning signal line driving circuit GD and the data signal line driving circuit SD.

Meanwhile we have seen in recent years the development of a technique for forming a pixel array and driving circuit in a monolithic manner by using a polycrystal silicon thin film, in response to various needs, for example, to improve the driving capabilities of pixel transistors for the realization of a big display screen, to cut down on the mounting costs of driving ICs, and to improve reliability in mounting. In pursuit of the realization of an even larger display screen and even lower costs, attempts are being made to form a transistor from a polycrystal silicon thin film on a glass substrate at a processing temperature below the distortion point (about 600° C.) of glass.

Such a liquid crystal display device integrated with a driving circuit has a configuration including, for example, a scanning signal line driving circuit (GD), a data signal line driving circuit (SD) and an pixel array (ARY) composed of pixels (PIXes) arranged in a matrix form, the circuits and pixels being provided on an insulating substrate (SUB), as shown in FIG. 26. The scanning signal line driving circuit GD and the data signal line driving circuit SD are connected to a control circuit (CTL) and a voltage generating circuit (VGEN).

A method for writing image data into a data signal line will be explained next. There are two methods for driving a data signal line: analogue and digital. When an IC is externally provided, the external IC incorporates an amplifier circuit to secure a driving capability in either of the methods. However, the liquid crystal display device integrated with a driving circuit employs as composing elements polycrystal silicon thin film transistors, whose properties are non-uniform. If an analogue circuit such as an amplifier circuit is used, the non-uniform properties result in non-uniformity in the output voltage, which in turn causes vertical stripes to appear on the displayed image. Therefore, generally, a driving circuit with no internally provided amplifier circuit is employed in the liquid crystal display device integrated with a driving circuit.

The following will explain a point-to-point successive driving method, which is most typically used in the liquid crystal display device integrated with a driving circuit, as an example of the analogue method.

The point-to-point successive driving method includes a data signal line driving circuit composed of a scanning circuit (shift register; SR), a buffer circuit (BUF), and sampling circuits (SMPs) corresponding to respective colors of red (R), green (G) and blue (B), as shown in FIG. 27. An image signal (DAT) inputted into an image signal line is written into a data signal line (SL) by opening and closing the sampling circuits SMPs in synchronization with an output pulse of each stage of the scanning circuit SR. The buffer circuit BUF latches in and amplifies an output signal out of the scanning circuit SR, and generates an inverse signal as necessary.

The method has an advantage of a very simple circuit arrangement, but has several disadvantages as well: Since the image signal DAT needs to be written into the data signal line SL in a short period of time (one dot period or approximately several times the dot period), the output impedance of an external circuit for supplying the image signal DAT should be low. Also, if the source of the image signal DAT is a digital signal, the image signal DAT needs to be converted to an analogue signal. Therefore, the total power consumption of the liquid crystal display device, including the power consumption at an external image signal generating section, becomes very large.

FIG. 28 shows a configuration example of the system. Since the image signal DAT is inputted to the data signal line driving circuit SD, the configuration needs a digital/ analogue converter (DAC) and a buffer amplifier (AMP), consuming a very large amount of power.

Various configurations are possible for the data signal line driving circuit of a digital method. Here will be explained a multiplexer method for selecting one of externally supplied gray scale voltages and supplying the selected gray scale voltage to a data signal line directly (without amplifying). The following example illustrates a case in which the input image signal is of three bits (eight gray scales) with respect to each color of R, G, and B.

The data signal line driving circuit includes, as shown in FIG. 29, a scanning circuit (shift register; SR), nine (=3 bits×RGB) latch-in circuits (LATs), as many transfer circuits (TRFs) as the latch-in circuits LATs, three decoder circuits (DECs) respectively composed of eight (=$2^3$) AND circuits, and twenty-four (=$2^3$×RGB) analogue switches (ASWs).

To this data signal line driving circuit are supplied a clock signal (CKS), a start signal (SPS), a transfer signal (TRP), nine (=3 bits×RGB) digital image signals (SIGs), and eight (=$2^3$) gray scale power supplies (VGSes). The data signal line driving circuit latches in the digital image signal SIG by opening and closing the latch-in circuit LAT in synchronization with an output pulse of each stage of the scanning circuit SR, and transfers the digital image signal SIG to the decoder circuit DEC with the transfer circuit TRF during a horizontal blanking period. Then the data signal line driving circuit selects one of the eight gray scale power supplies according to a signal decoded by the decoder circuits DECs to output the selected gray scale power supply to the data signal line SL during a next horizontal scanning period.

According to this method, the image signal can take almost as much time as one horizontal period to be written into the data signal line SL, and is therefore not likely to be written improperly. However, as described above, the method has disadvantages: The circuit becomes very large (even a driving circuit of three bits input needs nine latch-in circuits, nine transfer circuits, twenty four AND circuits and twenty-four analogue switches), and requires as many external power supply circuits of a low output impedance (gray scale power supplies VGSes) as the display gray scales, the external power supply circuits being capable of directly writing the gray scale voltages into the data signal line SL.

FIG. 30 shows a configuration example of this system. The system needs to lower the output impedance of a gray scale voltage generating circuit (VGN) for supplying the gray scale voltages in the same manner as in the previous system. In other words, the system needs a driving capability to output the same gray scale voltages to all the data signal lines. Therefore, it is predicted that the total power consumption of the system becomes very large.

Incidentally, portable information terminals have become very popular in recent years. Those devices are in most cases driven by a battery, which strongly requires the display device incorporated therein to be power-saving as well as to be portable (small). However, the conventional driving method as explained above results in a very large power consumption outside the display device, for example, at an external power supply circuit, creating a possible obstacle in realizing a power-saving character with the system.

For this reason, to further reduce the power consumption, such a configuration and driving method should be adopted that the power consumption is reduced in parts other than the display device (pixel array and driving circuit). That is, a driving method using no analogue circuit and intermediate voltage generating circuit (gray scale voltage generating circuit) which may consume a large amount of power is preferred.

In addition, a configuration and driving method that can realize a reduction in size of the display device as well as the above mentioned reduction in power consumption is more preferred.

The backlight accounts for more than half the total power consumption in a typical color liquid crystal display device. A reflection type display device with no backlight has been developed as a result of giving a priority to reduction in power consumption. The reflection type liquid crystal display device does not have a very high contrast ratio, and in some cases does not need to adopt a conventional driving method. To put it in a different manner, the reflection type liquid crystal display device still has room for incorporation of a cheaper driving method and a driving method that can realize the reduction in power consumption.

As for the reduction in size of the device, as already mentioned, a liquid crystal display device composed of a driving circuit and pixel array integrally formed by using, for example, polycrystal silicon thin film transistors is very useful. However, such a liquid crystal display device has the following disadvantages.

As with the polycrystal silicon thin film transistor, the silicon crystals have diameters of the same order as the size of elements such as a thin film transistor and a resistor made of a polycrystal silicon thin film. The polycrystal silicon thin film transistor therefore inevitably has less uniform properties than do elements on a monocrystal silicon substrate. If such an element is used to configure the above mentioned analogue driving circuit or multiplexer digital driving circuit, the gray scale voltages for display may not be written with high precision mainly because of the non-uniform properties of the transistors of the output stage, failing to perform proper gray scale display.

Besides, especially when the polycrystal silicon thin film transistors is formed at a relatively low temperature below 600° C., the size of elements becomes large because of constraints in the driving capabilities and the withstand voltages of the elements, allowing the non-uniform properties to affect more greatly.

Consequently, preferably, the liquid crystal display device integrated with a driving circuit using polycrystal silicon thin film transistors employs a configuration and driving method that is not affected by the non-uniform properties of the elements, i.e., that does not require a highly precise write-in voltage.

SUMMARY OF THE INVENTION

An object of the present invention is to offer an active matrix type liquid crystal display device integrated with a driving circuit composed of polycrystal silicon thin film transistors that is little affected by non-uniform properties of elements and that consumes much less power.

In order to accomplish the object, an active matrix type liquid crystal display device in accordance with the present invention is characterized in that it includes:

a plurality of data signal lines arranged in one direction;

a plurality of scanning signal lines arranged in a direction crossing the plurality of data signal lines;

a plurality of pixels provided in a matrix form and connected to the plurality of data signal lines and to the plurality of scanning signal lines;

a data signal line driving circuit for supplying image data to the plurality of data signal lines; and a scanning signal line driving circuit for supplying a scanning signal to the plurality of scanning signal lines, wherein the data signal line driving circuit and the scanning signal line driving circuit are composed of polycrystal silicon thin film transistors that are formed on the same substrate as are the plurality of pixels, wherein each of the plurality of pixels is composed of a plurality of subpixels, and the plurality of subpixels are driven by a binary display.

In the above configuration, the active matrix type liquid crystal display device integrated with a driving circuit carries out half-tone display with an area gray scale display method, according to which a pixel is composed of a plurality of subpixels and the area of display regions is changed by an image signal corresponding to a binary display. Therefore, the configuration eliminates the needs to externally input an analogue signal and an intermediate voltage, and enables the driving circuit to be configured only with digital circuits.

This can reduce the power consumption of the system by a large amount. Especially, when such a liquid crystal display device is used in a reflection mode of a relatively small contrast ratio, it exhibits a high manufacturing yield, superior display uniformity, and very low power consumption.

Also, the driving circuit, being composed of only digital circuits, can tolerate non-uniform properties of elements to some extent and prevent a fall in its non-defective ratio.

Adopting the area gray scale display method causes the data signal lines to increase in number, and it is therefore anticipated that the cost of the driving circuit and the mounting cost of the driving circuit might increase. Nevertheless, the above configuration, in which the driving circuit is integrated, can achieve a large reduction in cost, compared to other display methods.

In addition, since the non-uniform properties of elements can be tolerated as a result of the adoption of the area gray scale display method, the polycrystal silicon thin film transistors can be formed on the substrate by processing in which the highest temperature does not exceed 600° C.

For a fuller understanding of the nature and advantages of the invention, reference should be made to the ensuing detailed description taken in conjunction with the accompanying drawings.

BRIEF DESCRIPTION OF THE DRAWINGS

FIG. 6(*b*) is a configuration view showing another configuration example of the data signal lines.

FIG. 7(*b*) is a configuration view showing even another configuration example of the pixels.

FIG. 12(*a*) is a configuration view showing a configuration example of pixels and data signal lines of an active matrix type liquid crystal display device of the sixth embodiment.

FIG. 12(*b*) is a configuration view showing another configuration example of the data signal lines.

FIG. 14(*b*) is a waveform chart showing an inputted image signal.

FIG. 14(*c*) a waveform chart showing a voltage applied to a pixel electrode.

FIG. 14(*d*) a waveform chart showing a voltage applied to an opposite electrode.

FIG. 14(*e*) a waveform chart showing a voltage applied to a liquid crystal element.

FIG. 15(*b*) is a waveform chart showing an inputted image signal.

FIG. 15(*c*) a waveform chart showing a voltage applied to a pixel electrode.

FIG. 15(*d*) a waveform chart showing a voltage applied to an opposite electrode.

FIG. 15(*e*) a waveform chart showing a voltage applied to a liquid crystal element.

FIGS. 23(a) to 23(k) are cross-sectional views showing steps in processing of a thin film transistor composing an active matrix type liquid crystal display device of the fifteenth embodiment.

DESCRIPTION OF THE EMBODIMENTS
[FIRST EMBODIMENT]

Referring to FIGS. 1 through 5, the following description will discuss an embodiment in accordance with the present invention.

Figure 1:
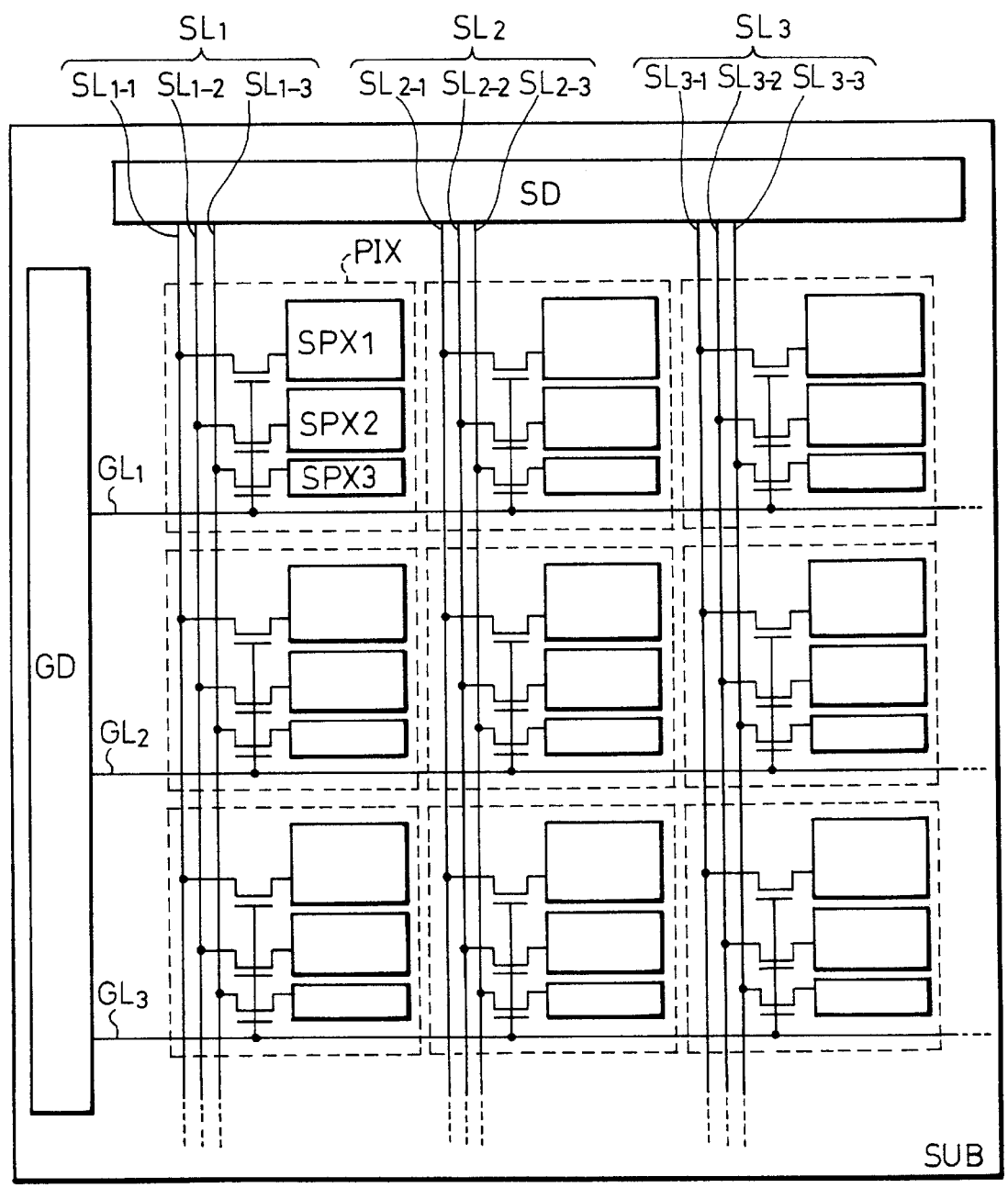
FIG. 1 is a configuration view showing an active matrix type liquid crystal display device of the first embodiment in accordance with the present invention.

FIG. 1 is a configuration view showing an active matrix type liquid crystal display device of the first embodiment. The liquid crystal display device includes on an insulating substrate (SUB) a scanning signal line driving circuit (GD), a data signal line driving circuit (SD) and a plurality of pixels (PIXes). The driving circuits and the pixels PIXes are composed of polycrystal silicon thin film transistors.

Each of the pixels PIXes is composed of three subpixels (SPX1, SPX2 and SPX3; the subpixels will be inclusively denoted as SPXes). The subpixels SPX1, SPX2 and SPX3 are connected to respective data signal lines ($SL_{i-1}$, $SL_{i-2}$ and $SL_{i-3}$) and to a common scanning signal line ($GL_j$), where i and j are numbers corresponding to from 1 to the number of the pixels PIXes. In the present and following embodiments, the data signal lines will be inclusively denoted as SLs and the scanning signal lines will be inclusively denoted as GLs.

Binary image data corresponding to display and nondisplay is written into each of the subpixels SPXes, effecting gray scale display in accordance with area of the subpixels SPXes in a display state. Note that although three subpixels SPXes are provided in a pixel PIX in FIG. 1, this is not the only possibility.

All the data signal lines SLs are connected to the data signal line driving circuit SD which samples an image signal inputted in synchronization with a timing signal, amplifies the image signal as necessary, and writes the image signal into the data signal lines SLs.

All the scanning signal lines GLs are connected to the scanning signal line driving circuit GD which writes into the pixel PIXes the image signals (image data) that has been written into the data signal lines SLs, and lets the pixels PIXes retain the image data written into the pixels PIXes, by sequentially selecting one of the scanning signal lines GLs and controlling opening and closing of switching elements in the pixel PIXes in synchronization with a timing signal.

Figure 2:
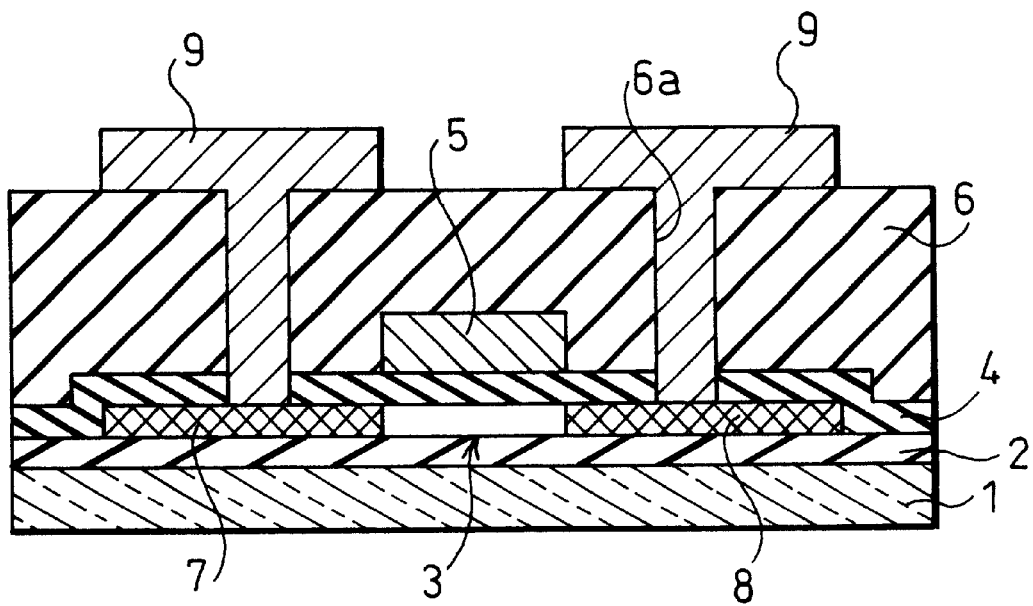
FIG. 2 is a cross-sectional view showing a structure of a polycrystal silicon thin film transistor composing the liquid crystal display device.

FIG. 2 is an example of a cross-sectional structure of a polycrystal silicon thin film transistor of the present embodiment. Although the thin film transistor (TFT) is formed in a staggering structure on an insulating substrate in FIG. 2, this is not the only possibility. The thin film transistor can be formed in other structures, for example, in a reverse staggering structure, and the following description still holds true.

The thin film transistor includes a polycrystal silicon thin film 3 formed on an insulating film 2 made of silicon dioxide on an insulating substrate 1. A gate electrode 5 made of aluminum and the like is formed on a gate insulating film 4 made of silicon dioxide on the polycrystal silicon thin film 3. An interlayer insulating film 6 made of silicon dioxide, silicon nitride, or the like is formed thereon. A source region 7 and a drain region 8 are formed by injecting impurity ions (phosphorous ions for the n-type region, and boric ions for the p-type region) into the polycrystal silicon thin film 3. The source region 7 and the drain region 8 are connected to metal wiring 9 of aluminum and the like through a contact hole $6a$ provided to the interlayer insulating film 6 and the gate insulating film 4.

The data signal line driving circuit SD, the scanning signal line driving circuit GD, and a pixel array composed of the plurality of pixels PIXes are easily formed on the single insulating substrate SUB in a single step, by using the polycrystal silicon thin film transistor shown in FIG. 2. This allows a larger cut in manufacturing costs than does separately forming the driving circuit and the pixel array, and solves problems of mounting cost and reliability.

Figure 3:
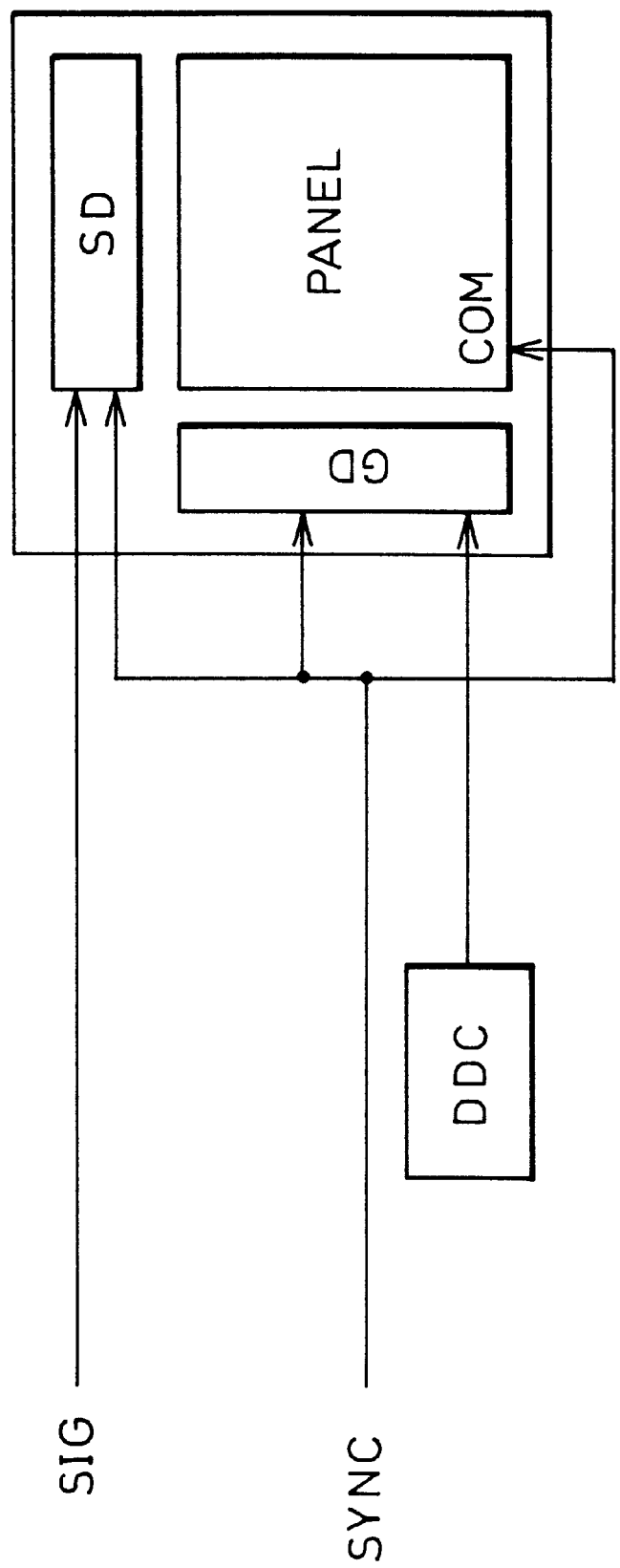
FIG. 3 is a configuration view showing a configuration example of a system of the liquid crystal display device.
Figure 28:
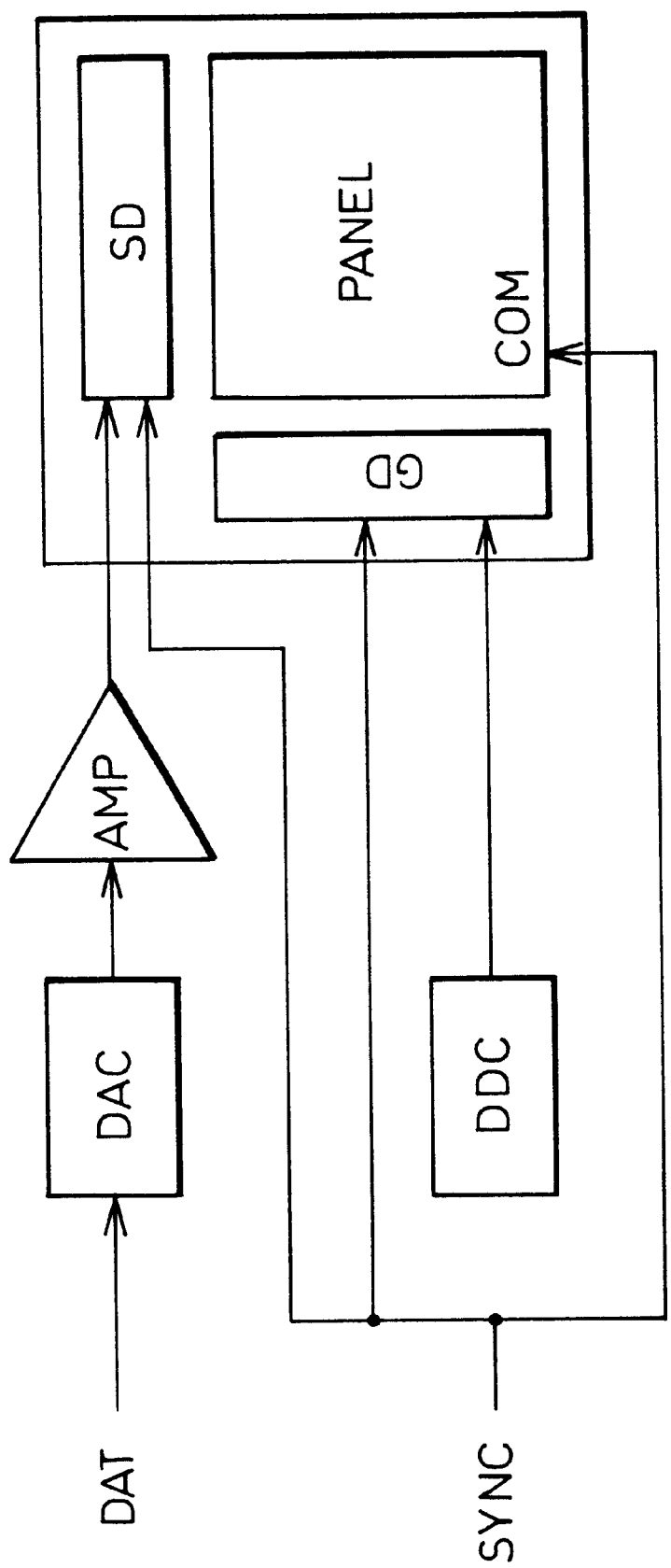
FIG. 28 is a configuration view showing a configuration example of a system of an active matrix type liquid crystal display device including a data signal line driving circuit shown in FIG. 27.
Figure 29:
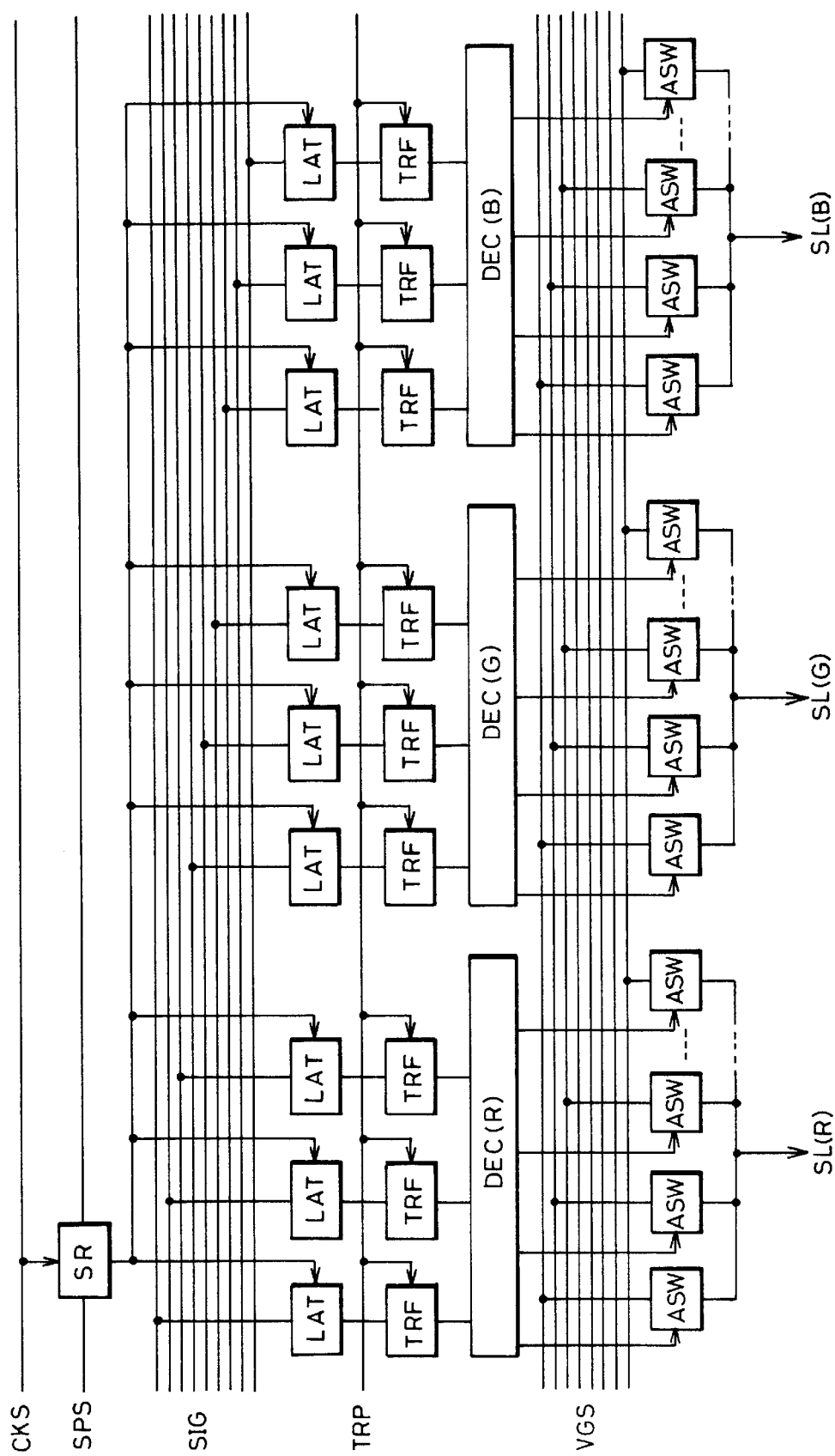
FIG. 29 is a configuration view showing a conventional data signal line driving circuit of a multiplexer method.
Figure 30:
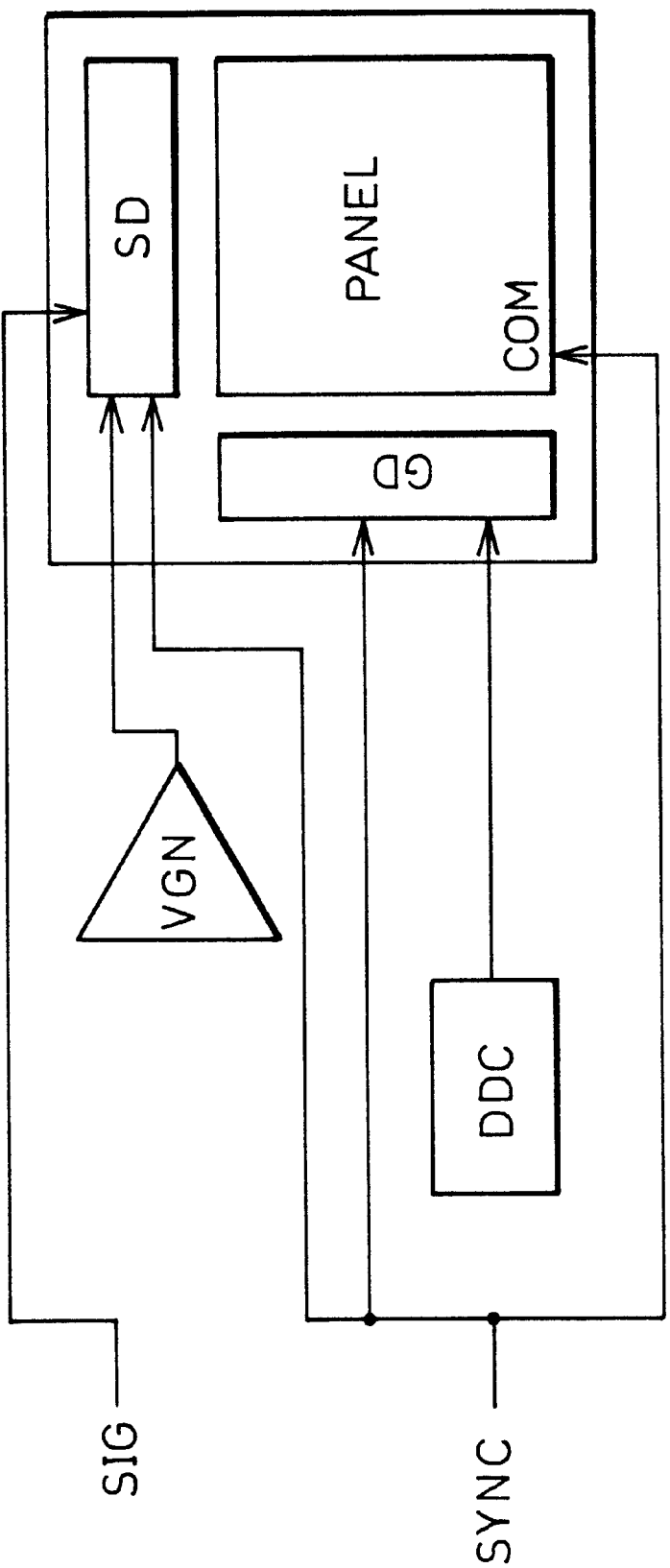
FIG. 30 is a configuration view showing a configuration example of a system of an active matrix type liquid crystal display device including a data signal line driving circuit shown in FIG. 29.

The liquid crystal display device of the present embodiment employs an area gray scale display method of carrying out gray scale display with an area of the subpixels SPXes, requiring no intermediate voltage for gray scale display. The liquid crystal display device therefore needs no power-consuming external analogue amplifier (see FIG. 28) and no gray scale voltage generating source (see FIG. 30). As a result, the system structure becomes simple as shown in FIG. 3, and the system as a whole can save much power. In FIG. 3, "DDC" denotes a DC-DC converter for generating a driving voltage of the scanning signal line driving circuit GD which is driven by a different voltage from that of the data signal line driving circuit SD, "PANEL" denotes a display area formed by the pixel array, "COM" denotes an opposite electrode formed to face the electrodes forming the pixels, and "SYNC" denotes a timing signal.

Since a liquid crystal display device integrated with a driving circuit typically employs a point-to-point successive driving method of inputting analogue image data into a data signal line of a large capacity load directly from the outside (without passing through an amplifier in the driving circuit), it is likely to consume much power, especially, at the analogue amplifier thereof. Therefore, a liquid crystal display device integrated with a driving circuit benefits greatly from the driving by voltages corresponding to the binary display states. The area gray scale display method is very effective in realizing out the gray scale display with the driving by voltages corresponding to the binary display states.

Figure 4:
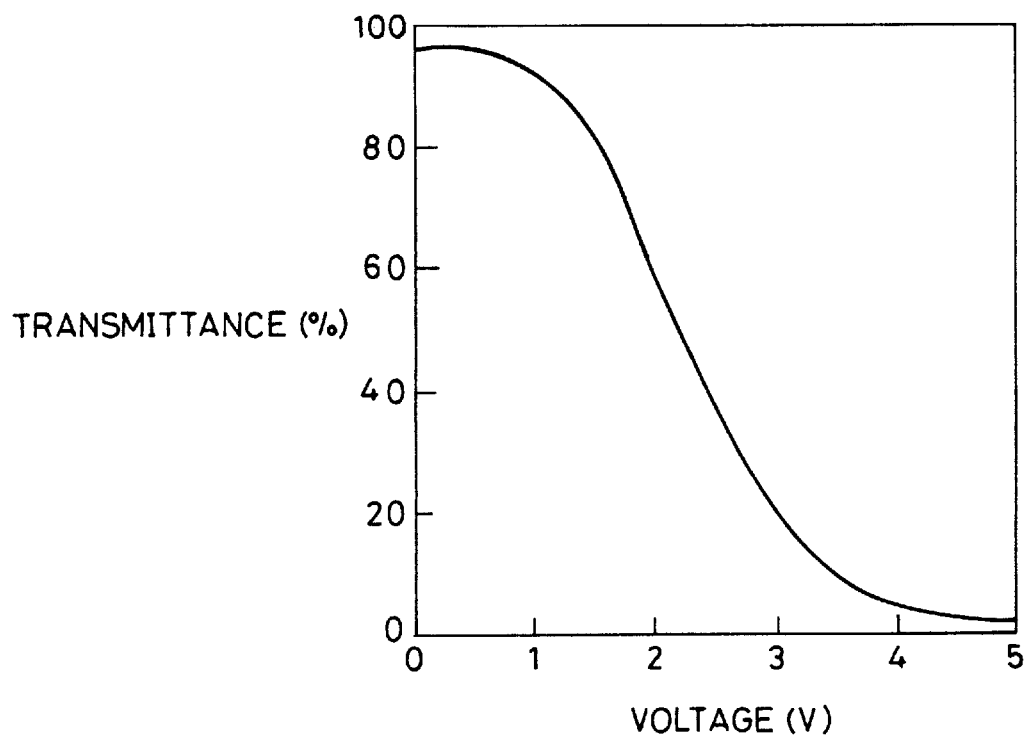
FIG. 4 is a graph showing the voltage versus transmittance property of TN liquid crystal.

FIG. 4, showing an example of optical properties of a liquid crystal element, is a drawing showing the relation between voltages and the transmittance of the TN (Twisted Nematic) liquid crystal element of a Normally-White mode that is most widely used at present. As shown in FIG. 4, the transmittance of the liquid crystal element changes greatly at intermediate voltages, while showing a relatively flat property with respect to voltage variations in the other areas. The present liquid crystal display device basically employs a binary display, and drives the liquid crystal elements with voltages near the both sides of FIG. 4. Therefore, as is clear from FIG. 4, the optical property changes little unless the applied voltage varies by a very large amount. Consequently, the write-in voltage into the data signal line does not need to be highly precise, and the driving capability (size) of a transistor for output can be made small. The transistor occupies a smaller area in the driving circuit, reducing the liquid crystal display device in size.

For the same reasons, the liquid crystal display device is less affected by the noise caused by non-uniform properties of elements, crosstalk between signals, and the like. Therefore, yield in manufacture is greatly improved in relation to, for example, process variations (a variation in the parasitic capacity due to a position shift of wiring, electrodes, etc., variations in the parasitic capacity and parasitic resistance due to non-uniformity in wire width and film thickness, and other variations), and property variations in the device (variations in the mobility, threshold voltage, leak current, etc. of the transistor composing a switching element).

Additional advantages are: the display is also little affected when, for example, the optical properties of the liquid crystal element have a hysteresis, or greatly vary with temperature.

Figure 5:
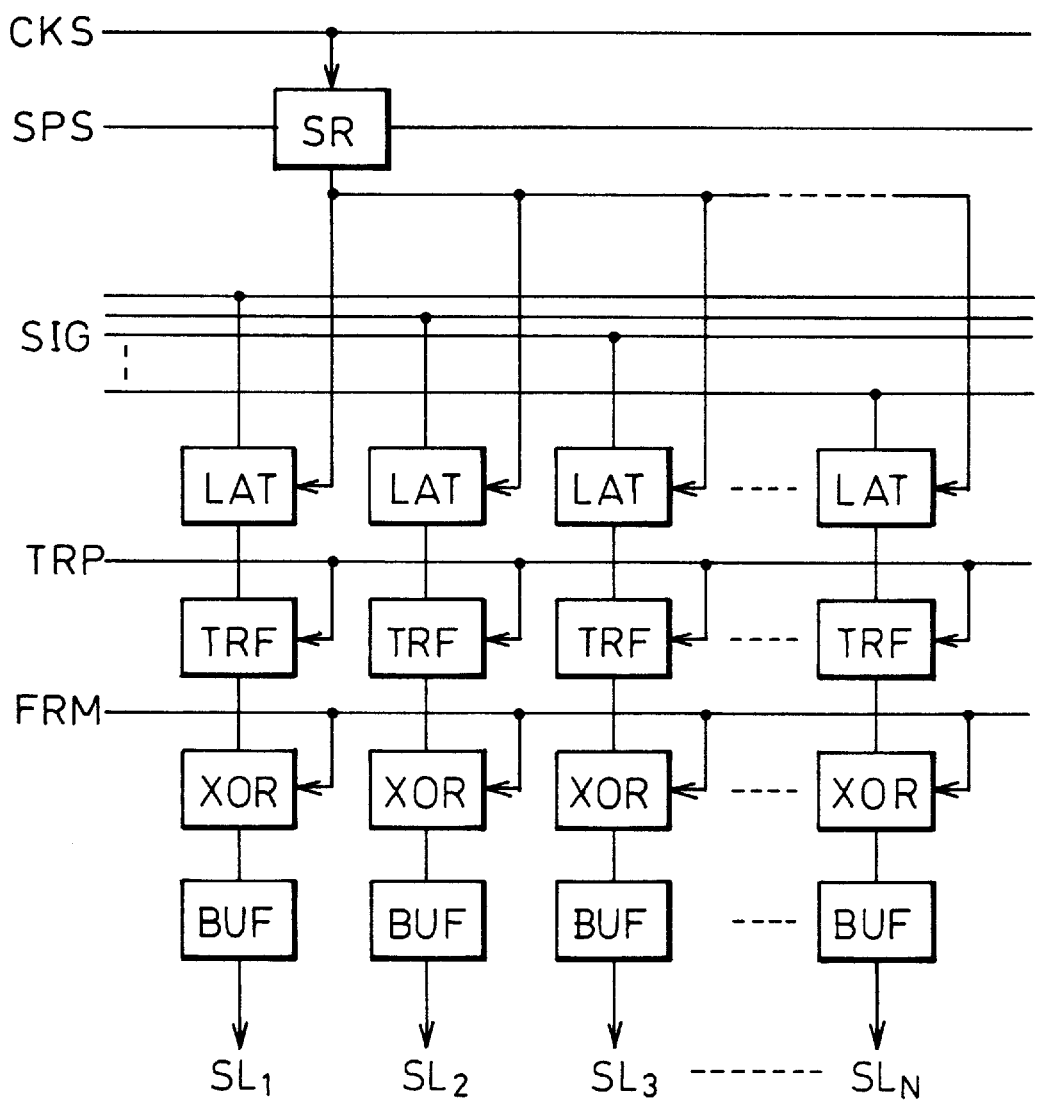
FIG. 5 is a configuration view showing a data signal line driving circuit of the liquid crystal display device.

FIG. 5 is a drawing showing a configuration example of the data signal line driving circuit for realizing the area gray scale display method. The data signal line driving circuit includes a scanning circuit (shift register; SR), a plurality of latch-in circuits (LATs), a plurality of transfer circuits (TRFs), a plurality of polarity inverting circuits (XORs) and a plurality of buffer circuits (BUFs). The polarity inverting circuit XOR is composed of an exclusive AND circuit and the like. The latch-in circuits LATs, transfer circuits TRFs, polarity inverting circuits XORs and buffer circuits BUFs are respectively provided in the same number as the data signal lines SLs (here, N pieces each).

The following description is a brief explanation of the operation. The digital image signals SIGs of a plurality of bits are latched in by the latch-in circuit LAT with a start signal SPS outputted in synchronization with the clock signal CKS, and the image signals for one horizontal scanning period are transferred together by the transfer circuit TRF during the horizontal blanking period according to the transfer signal TRF. Then the image signals are inverted or non-inverted by the polarity inverting circuit XOR according to a frame signal FRM at the inversion period of the polarity, and outputted at a desired output amplitude by the buffer circuit BUF to the data signal line SL.

In this manner, the data signal line driving circuit of the area gray scale display method has very simple circuitry in comparison to a digital driving circuit of a multiplexer method. Also, in comparison to an analogue driving circuit of a point-to-point successive method, the data signal line driving circuit of the area gray scale display method includes a large number of elements, but has approximately the same size (occupied area), because the transistors can be made small.

[SECOND EMBODIMENT]

Figure 6A:
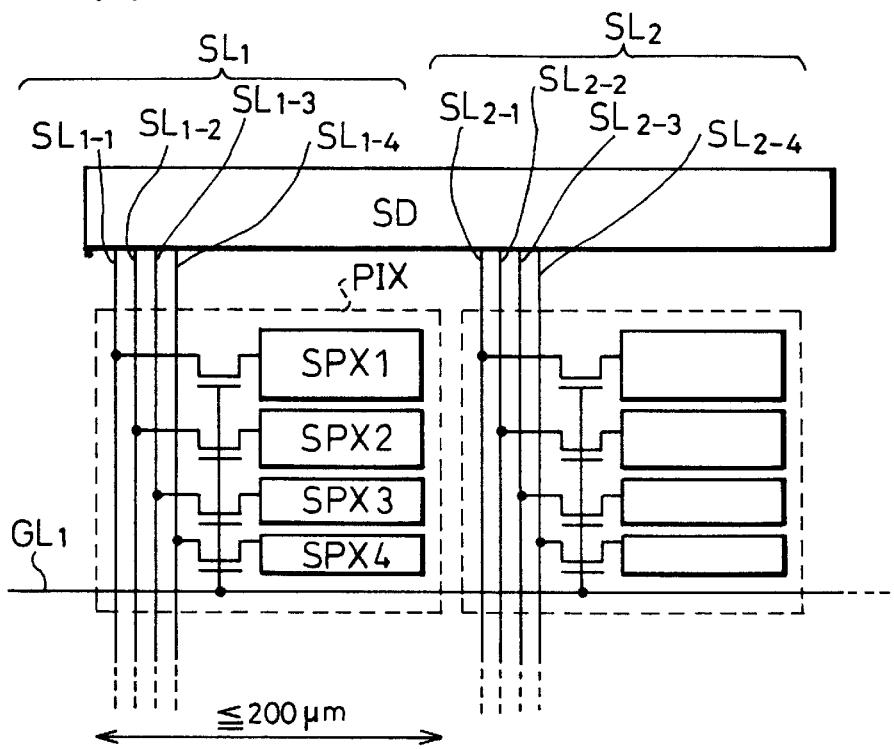
FIG. 6(*a*) is a configuration view showing a configuration example of pixels and data signal lines of an active matrix type liquid crystal display device of the second embodiment.
Figure 6B:
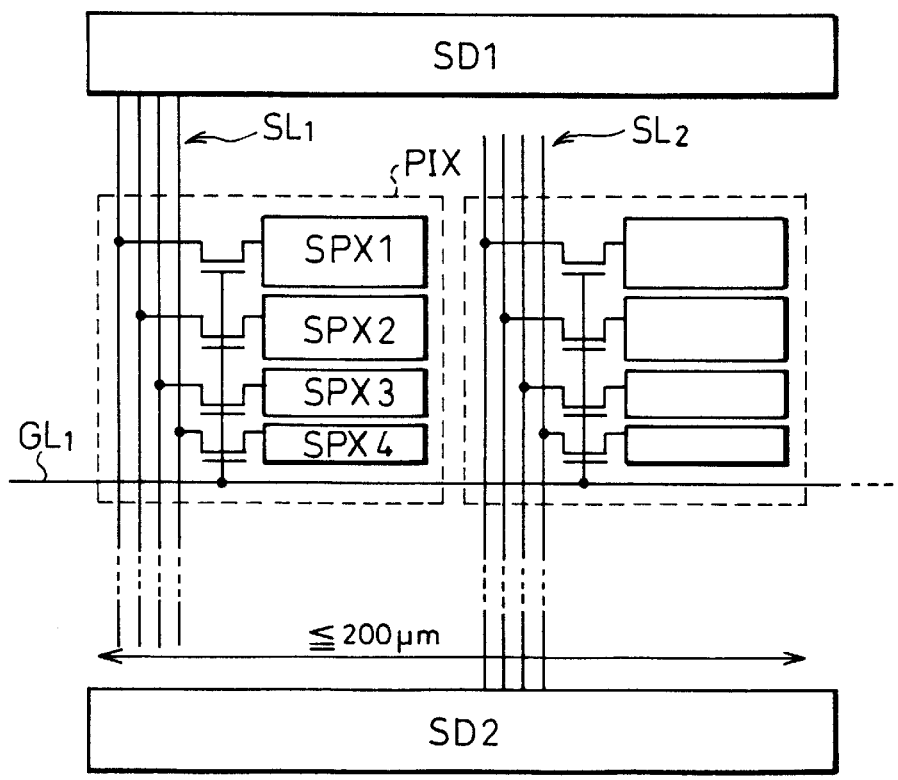

FIGS. 6(a) and 6(b) are drawings showing a configuration example of pixels of an active matrix type liquid crystal display device of the second embodiment.

Each pixel (PIX) of the liquid crystal display device is composed of four subpixels (SPX1 through SPX4). The subpixels SPX1 through SPX4 are connected to respective data signal lines ($SL_{i-1}$ through $SL_{i-4}$). The average pitch when the data signal line SLs are connected to the data signal line driving circuit SD does not exceed 50 μm.

Referring to FIG. 6(a), the data signal line driving circuit SD is provided along only one side of the pixel array composed of the pixels PIXes. All the data signal lines SLs are connected to the single data signal line driving circuit SD. The arrangement pitch of one pixel does not exceed 200 μm in this case.

By contrast, referring to FIG. 6(b), the data signal line driving circuit is composed of a first data signal line driving circuit SD1 and a second data signal line driving circuit SD2. The data signal line driving circuits SD1 and SD2 are provided along two opposite sides of the pixel array. Half the data signal lines SLs are connected to the first data signal line driving circuit SD1, and the rest are connected to the second data signal line driving circuit SD2. The arrangement pitch for two pixels does not exceed 200 μm in this case.

Incidentally, as above mentioned, in a conventional liquid crystal display device not integrated with a driving circuit, the driving circuit is mounted with, for example, TCP (Tape Carrier Package). However, the mounting interval available with present techniques is more than 50 to 70 μm.

Meanwhile, with the aforementioned area gray scale display method, as many data signal lines as the subpixels are required, and the pitches between the data signal lines become narrower as the number of the subpixels increases. The area gray scale display method carries out the gray scale display, using the resolution of the eye that is rougher than the size of the subpixels. Therefore, if the arrangement pitches of the subpixels, that is, the arrangement pitches of the data signal lines, are set to be large without consideration to that fact, a good display cannot be possibly carried out. Therefore, setting the average arrangement pitch of the subpixels to be narrower than 50 μm, and avoiding trouble in mounting by integrating the driving circuit are very effective in carrying out the gray scale display with the area gray scale display method which is capable of saving power consumption.

Figure 7A:
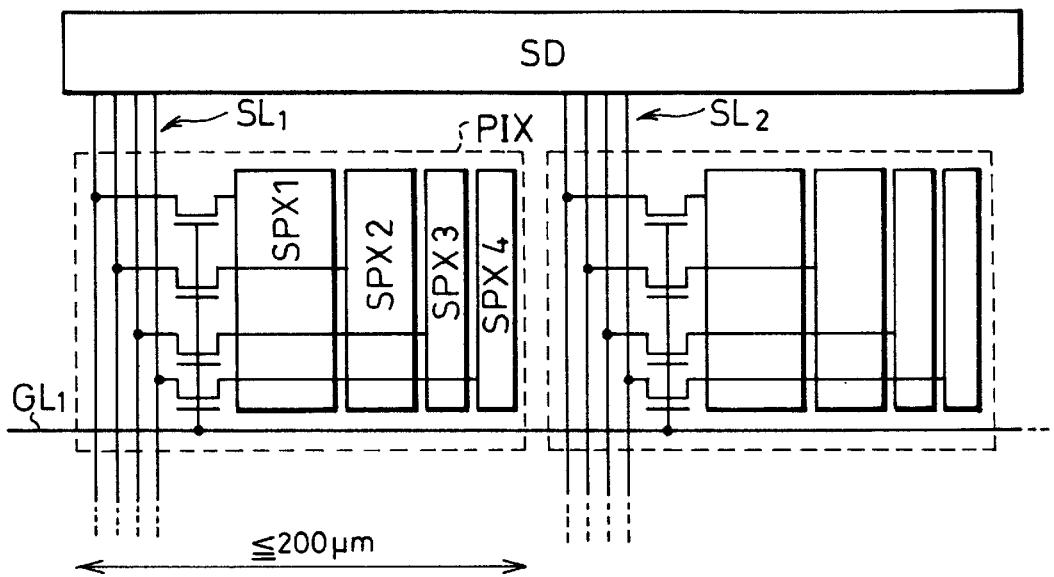
FIG. 7(*a*) is a configuration view showing another configuration example of the pixels.
Figure 7B:
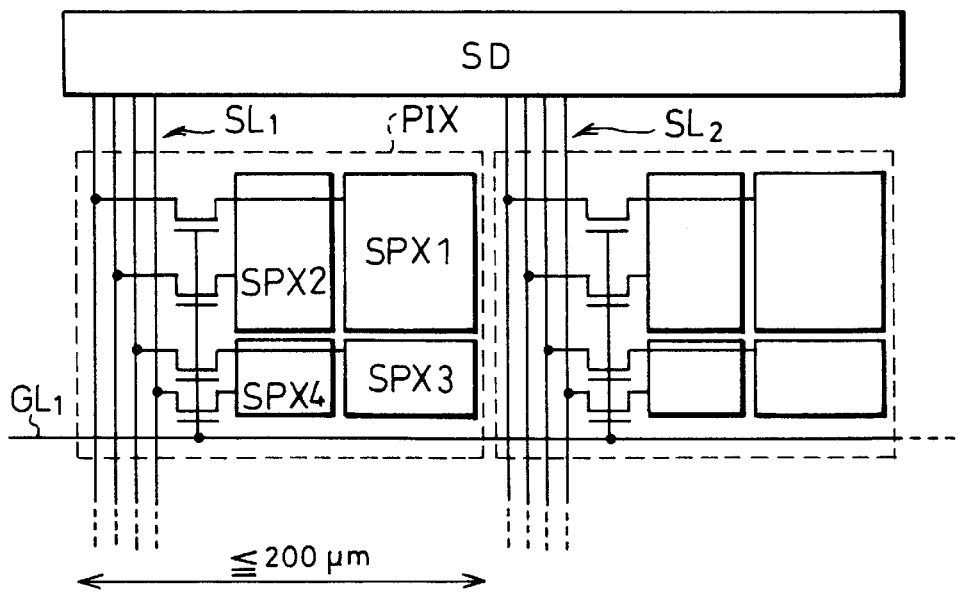

FIG. 6 shows a configuration in which the subpixels SPXes are disposed in a direction along which the data signal lines SLs extend; however, there is an alternative. FIG. 7 shows another configuration example of the subpixels SPXes. The arrangement pitches of the pixels PIXes (the arrangement pitches of the data signal lines SLs) in FIG. 7 are set to be the same as in FIG. 6(a). The subpixels SPXes can be either arranged to form a single row at right angles to a direction along which the data signal lines SLs extend (see FIG. 7(a)) or to form a matrix (see FIG. 7(b)). The subpixels can be arranged in various manners as shown here, and suit the purpose of the present invention no matter how they are arranged.

[THIRD EMBODIMENT]

Figure 8:
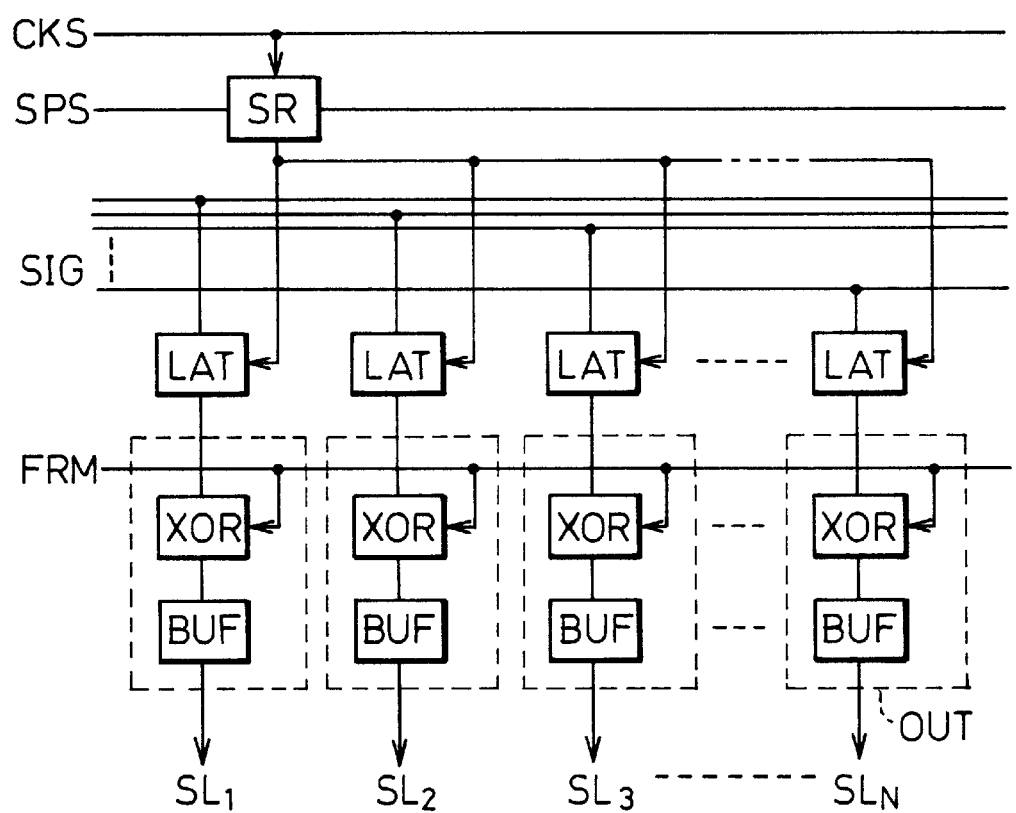
FIG. 8 is a configuration view showing a data signal line driving circuit of an active matrix type liquid crystal display device of the third embodiment.

FIG. 8 is a drawing showing a configuration example of a data signal line driving circuit of an active matrix type liquid crystal display device of the present embodiment. The data signal line driving circuit is different from the configuration of the circuit shown in FIG. 5 where it lacks the transfer circuit TRF. In other words, the data signal line driving circuit includes a scanning circuit (SR), a plurality of latch-in circuits (LATs) of small input capacities, and a plurality of outputting circuits (OUTs). The outputting circuit OUT is composed of a polarity inverting circuit (XOR) and a buffer circuit (BUF).

The following description is a brief explanation of the operation. The digital image signals SIGs of a plurality of bits are latched in by the latch-in circuit LAT with a start signal SPS outputted in synchronization with the clock signal CKS. Then the image signals are inverted or non-inverted by the polarity inverting circuit XOR in the outputting circuit OUT at the inversion period of the polarity, and outputted at a desired output amplitude by the buffer circuit BUF to the data signal line SL during the horizontal blanking period.

In the area gray scale display method, the image data written into the data signal lines and the pixels are voltages corresponding to the binary display, and an area where the applied voltage versus display property is relatively flat. Therefore, the area gray scale display method does not require a highly precise write-in voltage. Therefore, it does not take long to write in the data signal lines: the horizontal blanking period is sufficiently long. Therefore, the transfer circuit for transferring the image data for one horizontal scanning period altogether is no longer needed, making it possible to reduce the circuit in size.

Digital image signals can be stored at least until the end of the horizontal blanking period (actually, until image signals for a next horizontal scanning period are inputted) by making the input capacity of the latch-in circuit small.

[FOURTH EMBODIMENT]

Figure 9:
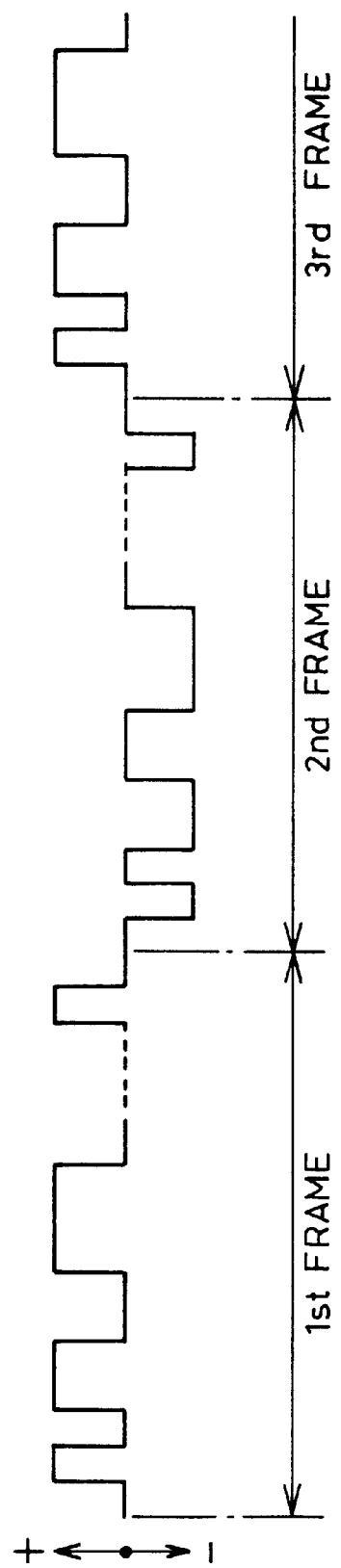
FIG. 9 is a waveform chart showing an example of a driving voltage for a liquid crystal element of an active matrix type liquid crystal display device of the fourth embodiment.

FIG. 9 is a drawing showing an example of a driving waveform for an active matrix type liquid crystal display device of the present embodiment. The axis of abscissas represents time and the axis of ordinate represents the voltage applied to the liquid crystal layer.

With the liquid crystal display device, as shown in FIG. 9, data of the same polarity is inputted into all the pixels during each frame period, and the polarity is inverted for every frame period (frame inversion driving). The contrast ratio of the liquid crystal display device here is set to be not larger than 15:1.

The contrast ratio is approximately 100:1 to 200:1 in a transparent active matrix type liquid crystal display device used in an ordinary notebook type personal computer. In this case, if only the frame inversion driving is carried out, flickering corresponding to the inversion of the polarity is likely to be observed with the displayed image. Therefore, the display is carried out in combination with gate line inversion, source line inversion or dot inversion. These driving methods, however, inevitably increase the power consumption in inverse display.

Here, only the frame inversion driving is adopted with a liquid crystal display device having a contrast ratio of not larger than 15:1. With a liquid crystal display device having a small contrast ratio, flickering does not much affect the displayed image, practically posing no problem in display. Therefore, such a liquid crystal display device benefits much from the frame inversion driving that makes it possible to further reduce the power consumption.

[FIFTH EMBODIMENT]

Figure 10:
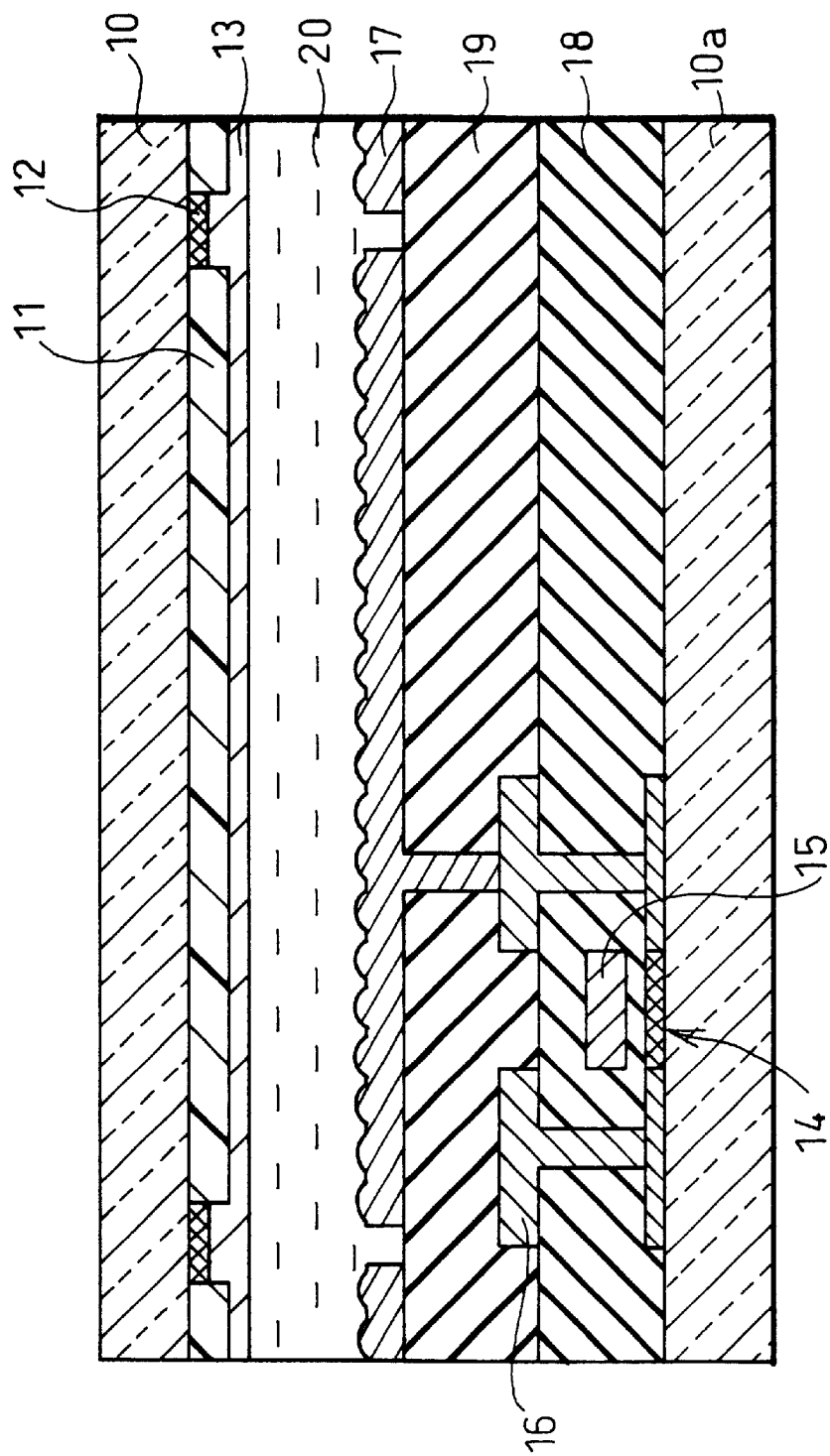
FIG. 10 is a cross-sectional view showing a structure of a reflection type liquid crystal display device of an active matrix type liquid crystal display device of the fifth embodiment.

FIG. 10 is a cross-sectional view showing a structure example of an active matrix type liquid crystal display device of the present embodiment.

The liquid crystal display device is of a reflection type, and is composed of two substrates 10 and 10a sandwiching a liquid crystal layer 20. One of the substrates, the upper substrate 10, is transparent and is provided on its side facing the other substrate, the lower substrate 10a, with a color filter 11 and a light shielding film 12. A transparent electrode (opposite electrode) 13 is provided to cover the color filter 11 and the light shielding film 12. On the other substrate 10a are provided a transistor 14 as a switching element, a scanning signal line (gate line) 15 for driving the transistor 14, a data signal line (source line) 16 for supplying image signals, and a reflection electrode 17. A first interlayer insulating film 18 and a second interlayer insulating film 19 are formed to electrically insulate the scanning signal line 15, the data signal line 16 and the reflection electrode 17 from one another.

Here, the transistor 14 may be an MOS transistor on a semiconducting substrate or a thin film transistor on an insulating substrate. In the present embodiment, the liquid crystal layer 20, formed from a mixture of nematic liquid crystal and two-color pigment, carries out display with a guest-host mode.

In the area gray scale display method, a pixel is divided into a plurality of subpixels, which increases the number of switching elements in the pixel and, consequently, increases the area occupied by those switching elements. Therefore, in order to increase the aperture ratio, it is important to effectively use the space on the switching elements. As for the reflection type liquid crystal display device, unlike the transparent liquid crystal display device, the reflection electrode can be also be formed on the switching elements by making the reflection electrode a different conductive layer from the data signal lines. Therefore, the aperture section can be made almost as large as the subpixel area.

In combination with the above-mentioned frame inversion driving method, the intervals of the electrodes between the pixels and the subpixels (e.g., the reflection electrode 17 in FIG. 10) can be made as narrow as possible for the following reasons. The potentials of the electrodes in adjacent pixels and subpixels always share the same polarity (actually, have opposite polarities only during a horizontal period in one frame period: however, the affection is small), thereby generating a small longitudinal electric field. Consequently, even if the distances between the display electrodes are made small, disclination which degrades the display quality does not occur.

Figure 11:
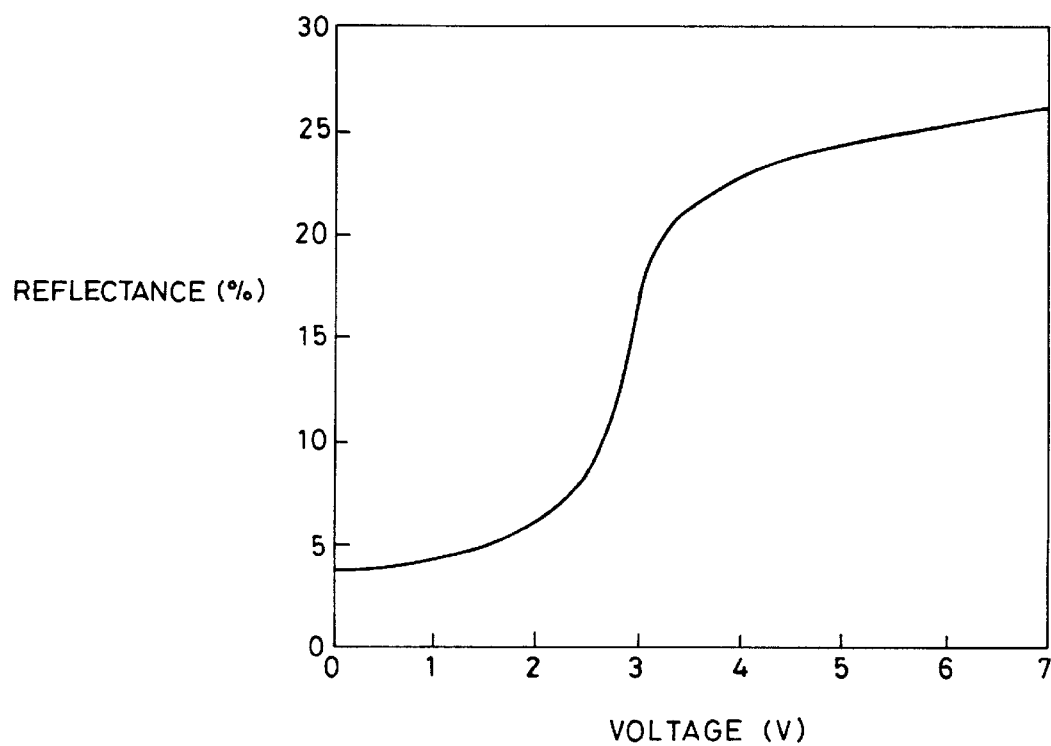
FIG. 11 is a graph showing an example of a voltage versus reflectance property of liquid crystal in a guest-host mode.

FIG. 11 is a graph showing an example of a voltage versus reflectance property of a reflection type liquid crystal element. Reflection to a somewhat wide solid angle is necessary to attain good visibility with a reflection type liquid crystal display device, which constrains the brightness (reflectance in each direction). As a result, since the contrast ratio is small in comparison with that of a transparent liquid crystal display device (e.g., approximately 6:1 in FIG. 11), it is possible to realize the configuration described in the fourth embodiment.

[SIXTH EMBODIMENT]

FIG. 12(a) is a drawing showing a configuration example of pixels of an active matrix type liquid crystal display device of the present embodiment.

In the liquid crystal display device, the pixel array is composed of a plurality of picture elements CPE arranged in a matrix form. Each picture element CPE includes three pixels of red (R), green (G) and blue (B) colors. The red pixel includes three subpixels $SPX_{R3}$, $SPX_{R2}$ and $SPX_{R1}$ having an electrode area ratio of 1:2:4. The green pixel includes three subpixels $SPX_{G3}$, $SPX_{G2}$ and $SPX_{G1}$ having the same electrode area ratio. The blue pixel includes three subpixels $SPX_{B3}$, $SPX_{B2}$ and $SPX_{B1}$ having the same electrode area ratio.

The subpixels $SPX_{R1}$ through $SPX_{R3}$ are connected to data signal lines $SL_{iR}$ (here, connected to $SL_{iR-1}$ through $SL_{iR-3}$ corresponding respectively to the three subpixels $SPX_{R1}$ through $SPX_{R3}$). The subpixels $SPX_{G1}$ through $SPX_{G3}$ and the subpixels $SPX_{B1}$ through $SPX_{B3}$ are connected respectively to data signal lines $SL_{iG}$ (i.e., $SL_{iG-1}$, $SL_{iG-2}$ and $SL_{iG-3}$) and $SL_{iB}$ (i.e., $SL_{iB-1}$, $SL_{iB-2}$ and $SL_{iB-3}$).

The data signal line driving circuit SD is provided along only one side of the pixel array. All the above data signal lines SLs are connected to the data signal line driving circuit SD.

As mentioned above, any gray scale can be displayed, and the bits of inputted digital image signals can be made to correspond to the respective subpixels, by setting the electrode area ratio of a subpixel (e.g., the subpixel $SPX_{R2}$) to a subpixel (e.g., the subpixel $SPX_{R1}$) having the largest electrode area after that subpixel to 2:1. This eliminates the need for an operation step in the data signal line driving circuit, simplifying the configuration of the circuit.

If the number of divisions of a pixel (the number of subpixels) is increased, the number of gray scales that can be displayed increases accordingly. However, this complicates the arrangement of the elements and wiring composing the pixels and driving circuit. Considering that the pixel size to obtain good gray scale display with the area gray scale display method does not exceed 300 μm, it is in some cases difficult to divide a pixel into four or more subpixels in processing of the aforementioned polycrystal silicon thin film transistor. It is needless to mention that there are device structures and process specifications that make it possible to divide a pixel into four or more subpixels.

Increasing the number of divisions results in an increase in the space between the subpixels that does not function as a display area, reducing the aperture ratio and causing problems of low brightness and a low contrast.

Meanwhile, it is meaningless to increase without consideration the number of divisions in a liquid crystal display device of a low contrast ratio, such as the reflection type liquid crystal display device explained in the fifth embodiment, because the number of gray scales that can be recognized is small. Taking into account that a present transparent liquid crystal display device has a contrast ratio of 200:1 and is capable of displaying 128 to 256 gray scales, display capability of approximately eight gray scales is sufficient with the aforementioned reflection type liquid crystal display device having a contrast ratio of approximately 6:1.

Therefore, the configuration of a pixel divided into three subpixels is very useful in that it is capable of carrying out eight gray scales and, thus, satisfactory display, and allows the pixels and driving circuit to be easily arranged.

Incidentally, well-known methods for configuring the reflection type color liquid crystal display device are an additive color mixture method using a color filter and three pixels corresponding to red (R), green (G) and blue (B) colors disposed side by side, and a subtractive color mixture method using three liquid crystal layers corresponding to cyan (C), magenta (M) and yellow (Y) colors stacked on one another.

The subtractive color mixture method effects a bright display in principle, but requires the liquid crystal elements (at least two of the three layers) to be of a transparent type. Therefore, the subtractive color mixture method cannot produce a satisfactory result if adopted with switching elements that occupy a large area, such as those used in the area gray scale display method, because of a resultant low aperture ratio.

For this reason, the color display with the area gray scale display method is preferably carried out by disposing the three pixels corresponding to RGB side by side.

Although a single data signal line driving circuit SD is provided in FIG. 12(a), two data signal line driving circuits may be provided. To be more specific, as shown in FIG. 12(b), a first data signal line driving circuit SD1 and a second data signal line driving circuit SD2 are disposed on the opposite sides of the pixel array, half the data signal lines SLs being connected to the first data signal line driving circuit SD1, the rest being connected to the second data signal line driving circuit SD2. Since the connection pitch of the data signal lines SLs in this configuration doubles from the configuration shown in FIG. 12(a), it becomes possible to apply the configuration to a panel of higher precision (a panel of the same size with more pixels, or a panel of a smaller size with the same number of pixels).

[SEVENTH EMBODIMENT]

Figure 13:
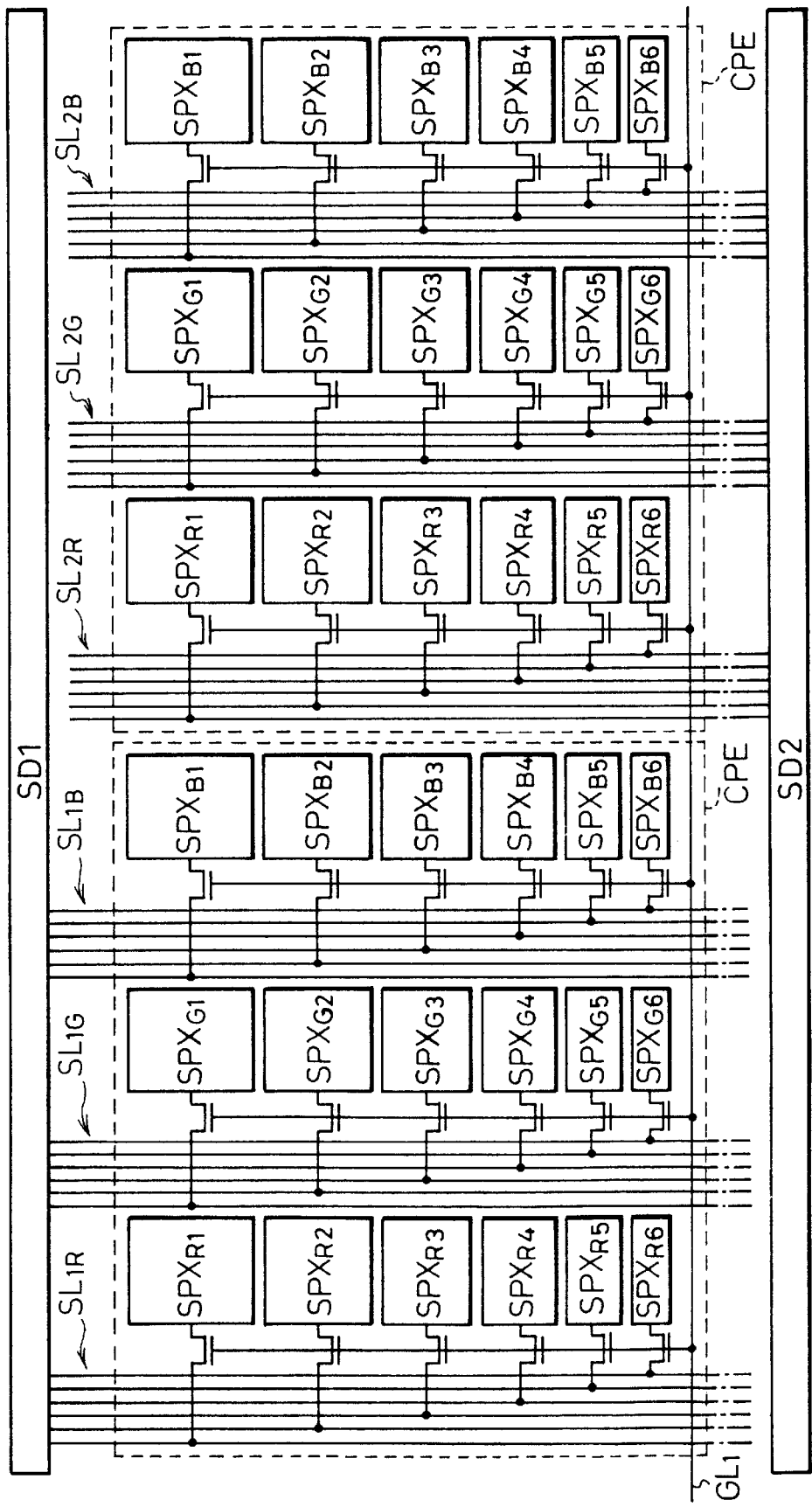
FIG. 13 is a configuration view showing a configuration example of pixels and data signal lines of an active matrix type liquid crystal display device of the seventh embodiment.

FIG. 13 is a drawing showing a configuration example of pixels of an active matrix type liquid crystal display device of the present embodiment.

The liquid crystal display device of the present embodiment is basically the same as the liquid crystal display device shown in FIG. 12(b) of the sixth embodiment, except that they differ in the number of the data signal lines and the number of the subpixels. To be more specific, the data signal line driving circuit is composed of a first data signal line driving circuit SD1 and a second data signal line driving circuit SD2 that are disposed on the opposite sides of the pixel array. Half the data signal lines SLs are connected to the first data signal line driving circuit SD1, and the rest are connected to the second data signal line driving circuit SD2. For example, the odd-numbered data signal lines $SL_{1R}$, $SL_{1G}$, $SL_{1B}$, $SL_{3R}$, $SL_{3G}$, $SL_{3B}$ . . . are connected to the first data signal line driving circuit SD1, and the even-numbered data signal lines $SL_{2R}$, $SL_{2G}$, $SL_{2B}$, $SL_{4R}$, $SL_{4G}$, $SL_{4B}$ . . . are connected to the second data signal line driving circuit SD2.

A picture element CPE includes three pixels of red (R), green (G) and blue (B) colors. The red pixel includes six subpixels $SPX_{R6}$ to $SPX_{R1}$ having an electrode area ratio of 1:2:4:8:16:32. The green pixel includes six subpixels $SPX_{G6}$ to $SPX_{G1}$ having the same electrode area ratio. The blue pixel includes six subpixels $SPX_{B6}$ to $SPX_{B1}$ having the same electrode area ratio.

Here, for convenience, the following description only explains the features that are unique to the present embodiment. The features that are shared between the present and sixth embodiments will be omitted from the description.

As mentioned above, if the number of divisions of a pixel (the number of subpixels) is increased, the number of gray scales that can be displayed increases accordingly. However, this complicates the arrangement of the elements and wiring composing the pixels and driving circuit. An effective solution to such a problem when the number of gray scales is to be increased is to feasibly expand the pitches of the data signal lines by dividing the data signal line driving circuit into two parts and disposing them on the opposite sides of the pixel array. The number of the subpixels can be doubled in this manner, allowing six subpixels to be provided in a pixel with the data lines of the same pitches as in the six embodiment. As a result, display of 64 gray scales (262,144 colors) becomes possible.

This is particularly effective, for example, when the contrast ratio of the reflection type liquid crystal display device is considerably improved, and when the reflection type liquid crystal display device is used as a projector panel.

[EIGHTH EMBODIMENT]

Figure 14:
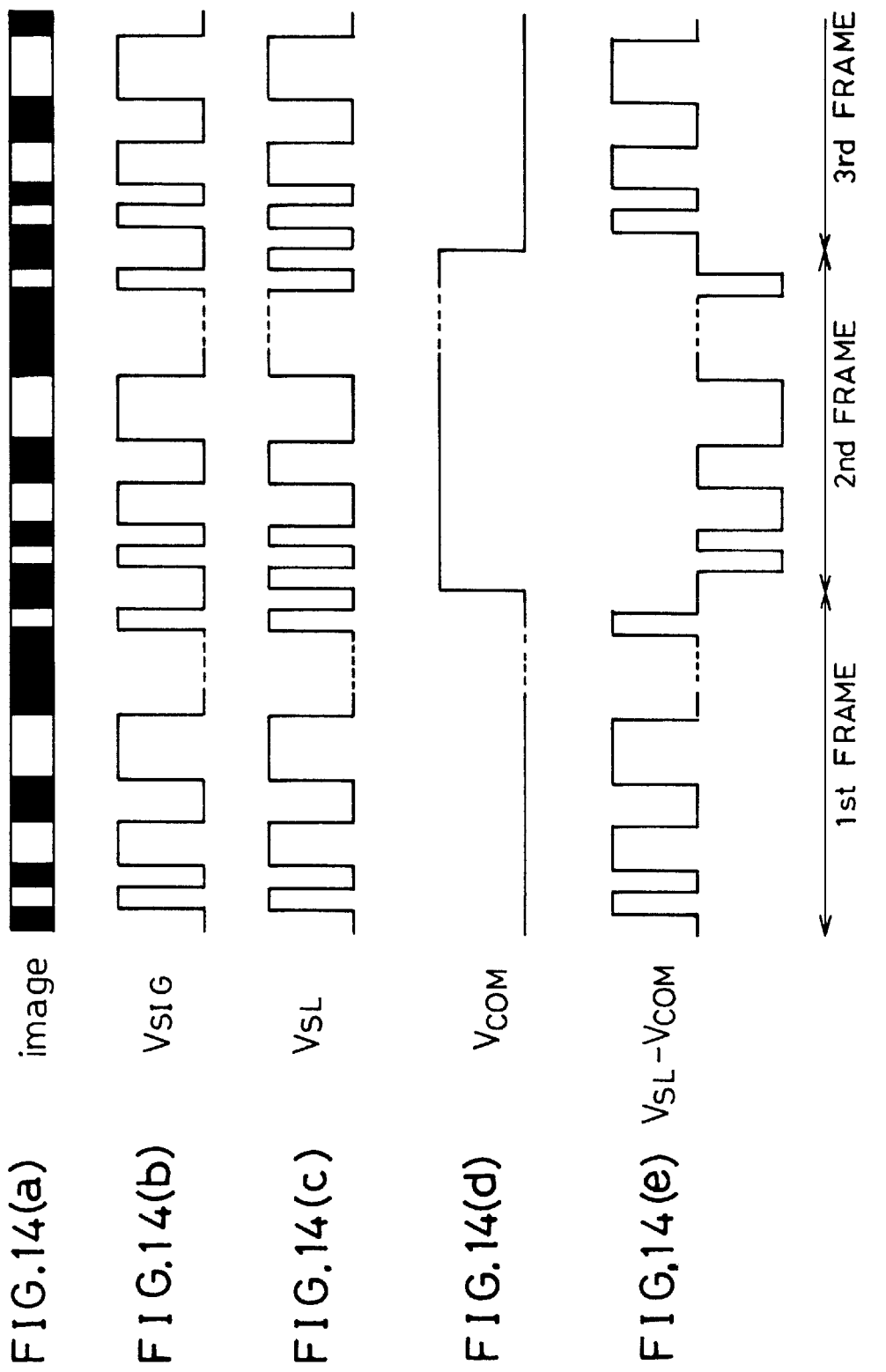
FIG. 14(*a*) is an explanatory view showing an image displayed by an active matrix type liquid crystal display device of the eighth embodiment.

FIGS. 14(a) through 14(e) are drawings showing an example of a driving waveform for an active matrix type liquid crystal display device of the present embodiment, FIG. 14(a) showing a displayed image (white/black), FIG. 14(b) showing an inputted image signal $V_{SIG}$, FIG. 14(c) showing a voltage applied to a pixel electrode (data signal line) $V_{SL}$, FIG. 14(d) showing a voltage applied to an opposite electrode $V_{COM}$, and FIG. 14(e) showing a voltage applied to a liquid crystal element $V_{SL}-V_{COM}$ (the potential difference between the pixel electrode and the opposite electrode).

The liquid crystal display device AC-drives the voltage of the opposite electrode $V_{COM}$ at the same amplitude as that of the driving voltage of the liquid crystal element $V_{SL}$-$V_{COM}$ with the aforementioned frame inversion driving method. Therefore, the amplitude of the voltage of the image data written into the data signal line $V_{SL}$ becomes binary even when considering positivity and negativity, that is, potentials corresponding to time when a voltage is applied at positivity and to time when no voltage is applied at negativity and potentials corresponding to time when no voltage is applied at positivity and to time when a voltage is applied at negativity.

When the opposite electrode is not AC-driven, voltages of three levels, i.e., voltages when a voltage is applied at positivity, when no voltage is applied at positivity and negativity, and when a voltage is applied at negativity, need to be written. In this case, the output stage of the data signal line driving circuit needs to correspond to a trinary output, complicating the configuration of the circuit. In addition, since a power circuit having an output of three levels needs to be externally provided, an increase in power consumption as a system is anticipated.

In the present embodiment, since the output level of the data signal line driving circuit is binary, this kind of problem can be avoided. As a result, the liquid crystal display device can be made smaller and less power-consuming.

Besides, since the output is binary, the data signal line driving circuit can be composed only of logical circuits (digital circuits). With the area gray scale display method, since the data inputted into the data signal line driving circuit are all digital signals, including the clock signal CKS, start signal SPS, transfer signal TRP, and frame signal FRM, the power consumption in the data signal line driving circuit can be reduced by a large amount. Moreover, since only binary signals are handled by the data signal line driving circuit, non-uniform properties of elements do not affect the display unless the non-uniformities are very large. No external power-consuming analogue circuit is of course necessary, effecting power saving with the whole system.

[NINTH EMBODIMENT]

Figure 15:
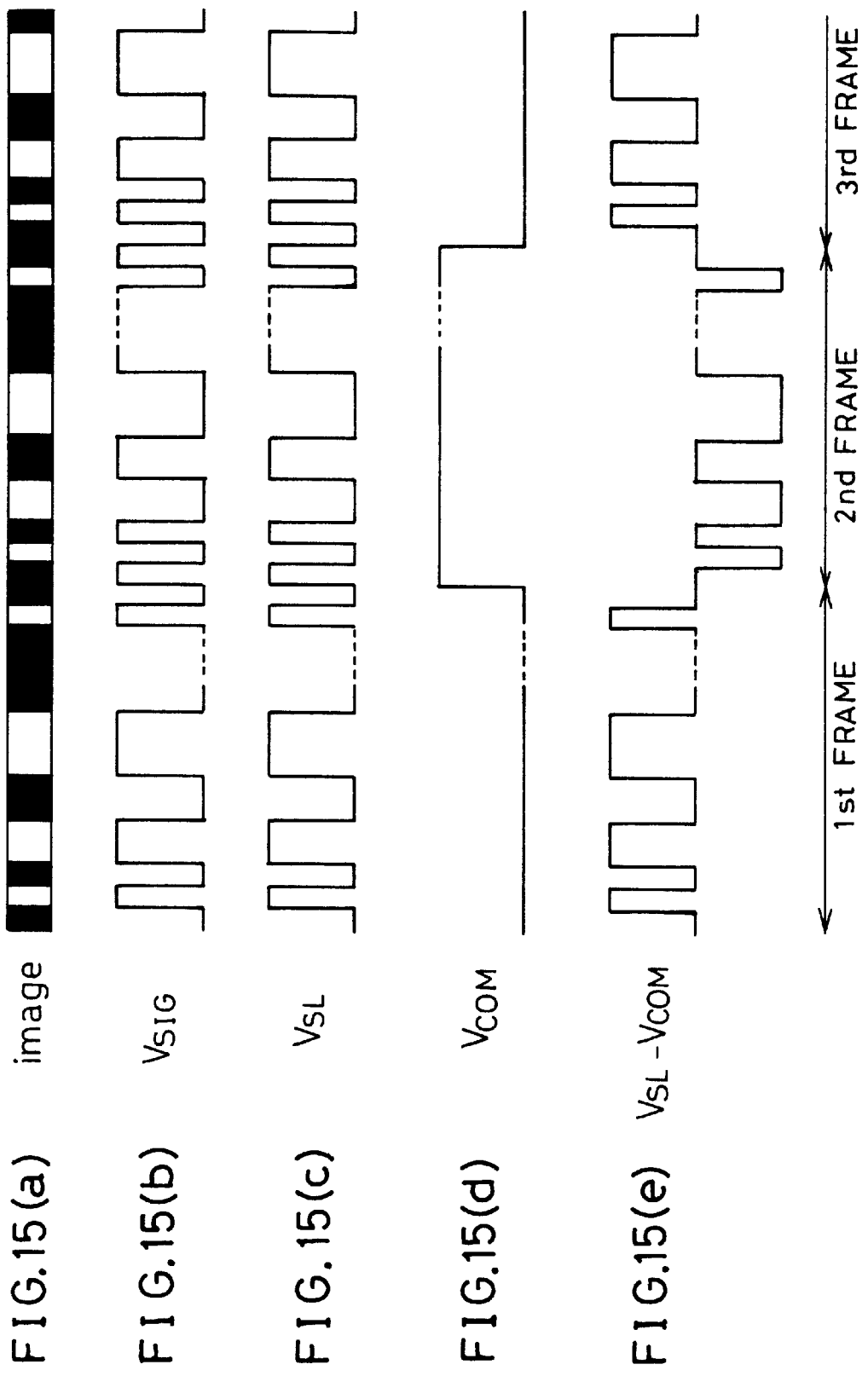
FIG. 15(*a*) is an explanatory view showing an image displayed by an active matrix type liquid crystal display device of the ninth embodiment.

FIGS. 15(a) through 15(e) are drawings showing an example of a driving waveform for an active matrix type liquid crystal display device of the present embodiment, FIG. 15(a) showing a displayed image (white/black), FIG. 15(b) showing an inputted image signal $V_{SIG}$, FIG. 15(c) showing a voltage applied to a pixel electrode (data signal line) $V_{SL}$, FIG. 15(d) showing a voltage applied to an opposite electrode $V_{COM}$, and FIG. 15(e) showing a voltage applied to a liquid crystal element $V_{SL}$-$V_{COM}$ (the potential difference between the pixel electrode and the opposite electrode).

The liquid crystal display device inverts the polarity of the inputted image signal $V_{SIG}$ according to the period of the AC-driving of the liquid crystal. Therefore, the inputted image signal $V_{SIG}$ can be outputted to a data signal line without a change in its polarity (after necessary adjustment of its amplitude).

Figure 16:
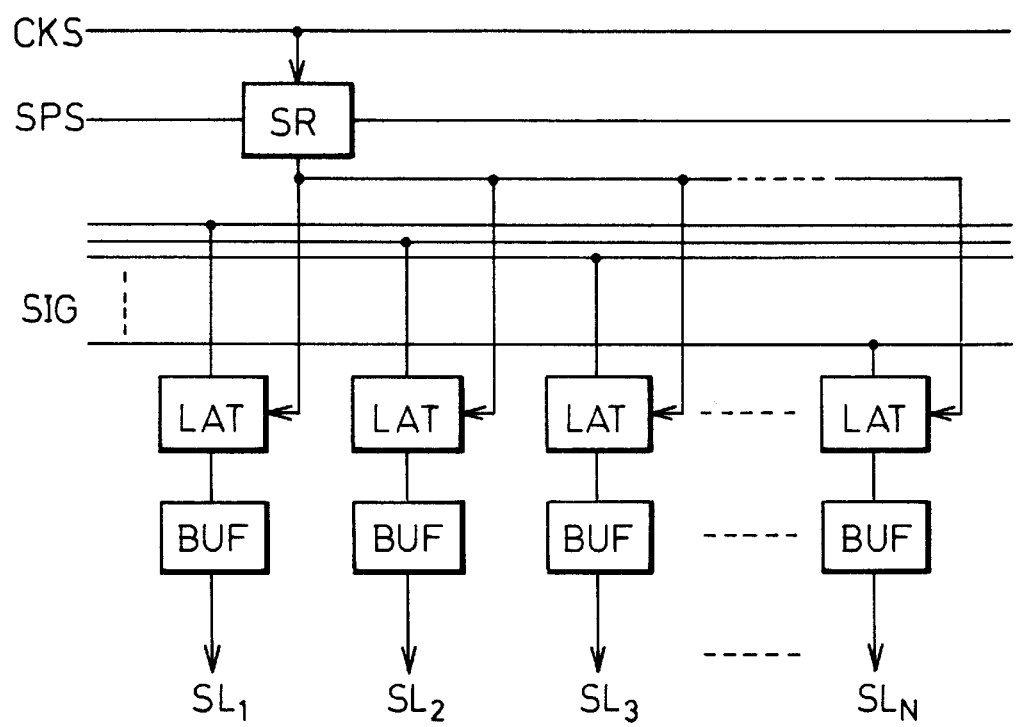
FIG. 16 is a configuration view showing a data signal line driving circuit of the liquid crystal display device.

For this reason, the configuration of the data signal line driving circuit can be made very simple as shown in FIG. 16. The data signal line driving circuit includes a scanning circuit SR, as many latch-in circuits LATs as the data signal lines SLs, as many buffer circuits BUFs as the latch-in circuits LATs. Compared to the configuration of a circuit shown in FIG. 5, the data signal line driving circuit lacks the transfer circuit TRF and the polarity inverting circuit XOR. Compared to the configuration of a circuit shown in FIG. 8, the data signal line driving circuit also lacks the polarity inverting circuit XOR.

As mentioned above, the configuration enables the configuration of the data signal line driving circuit to be of an extremely small size, having more notable advantages in cost, power consumption, architrave area, etc.

[TENTH EMBODIMENT]

Figure 17:
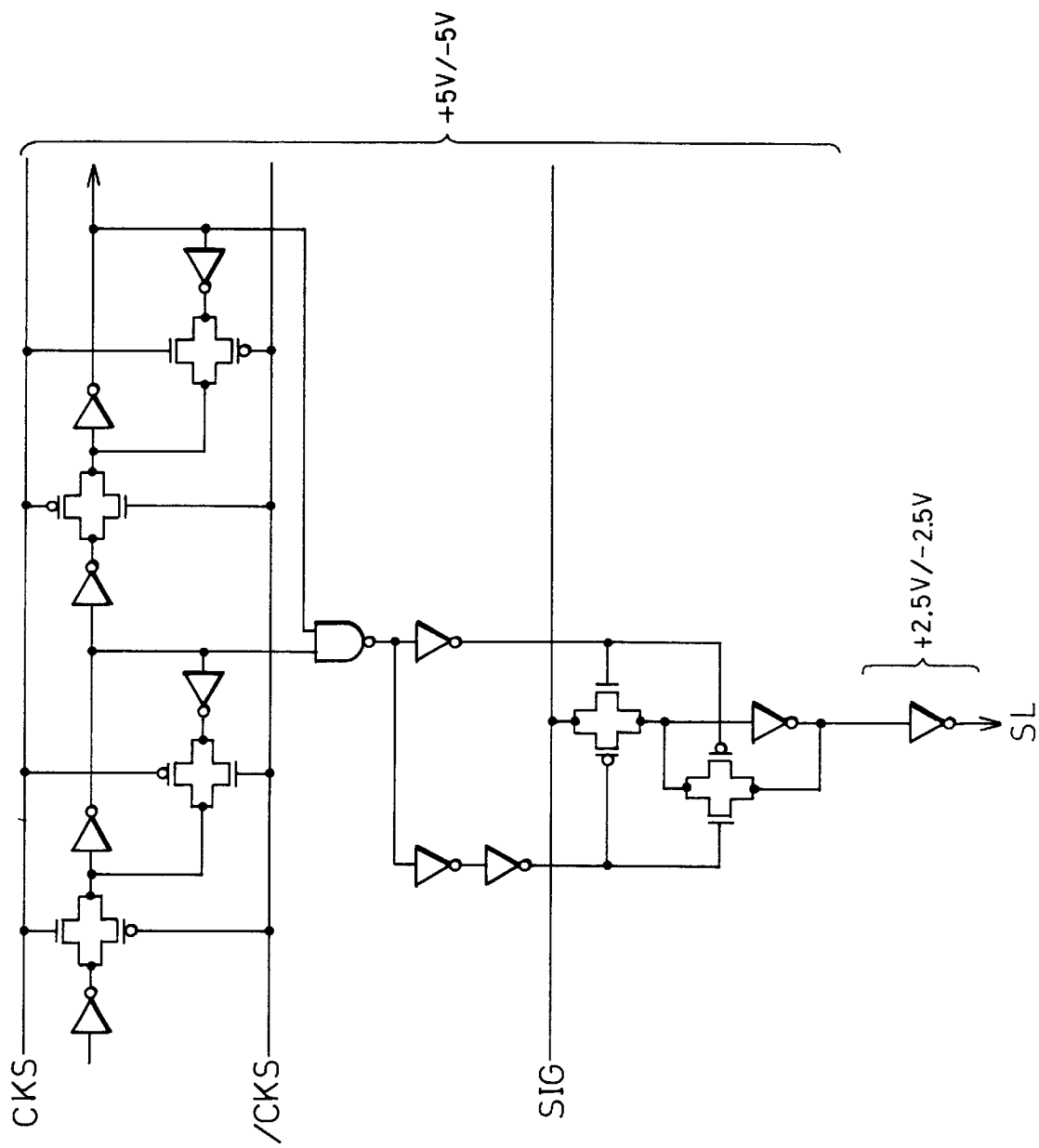
FIG. 17 a circuit diagram showing a data signal line driving circuit of an active matrix type liquid crystal display device of the tenth embodiment.

FIG. 17 is a drawing showing a data signal line driving circuit of an active matrix type liquid crystal display device of the present embodiment. The data signal line driving circuit in FIG. 17 basically has the same configuration as that shown in FIG. 16, except that FIG. 17 shows a circuit diagram at a lower level.

The data signal line driving circuit shown in FIG. 17 latches in a digital image signal SIG of a plurality of bits (FIG. 17 shows a circuit for only one bit for the sake of convenience) with a product of output signals for two stages of the scanning circuit, and outputs that signal via an inverter circuit driven by a voltage that is in accordance with liquid crystal application voltage to a data signal line SL. That is, the data signal line driving circuit is driven with a voltage with which a polycrystal silicon thin film transistor circuit is operable (e.g., 10 V in FIG. 17) except the inverter circuit of the last stage, whereas a liquid crystal driving voltage (e.g., 5 V in FIG. 17) is supplied to the inverter circuit of the last stage. Here, "/CKS" denotes a clock signal having an opposite phase from the clock signal CKS.

With this configuration, although the driving voltage of the inverter circuit of the last stage is low, the input signal thereto is given a sufficient amplitude. Therefore, signals of sufficient strength are outputted to data signal lines.

[ELEVENTH EMBODIMENT]

Figure 18:
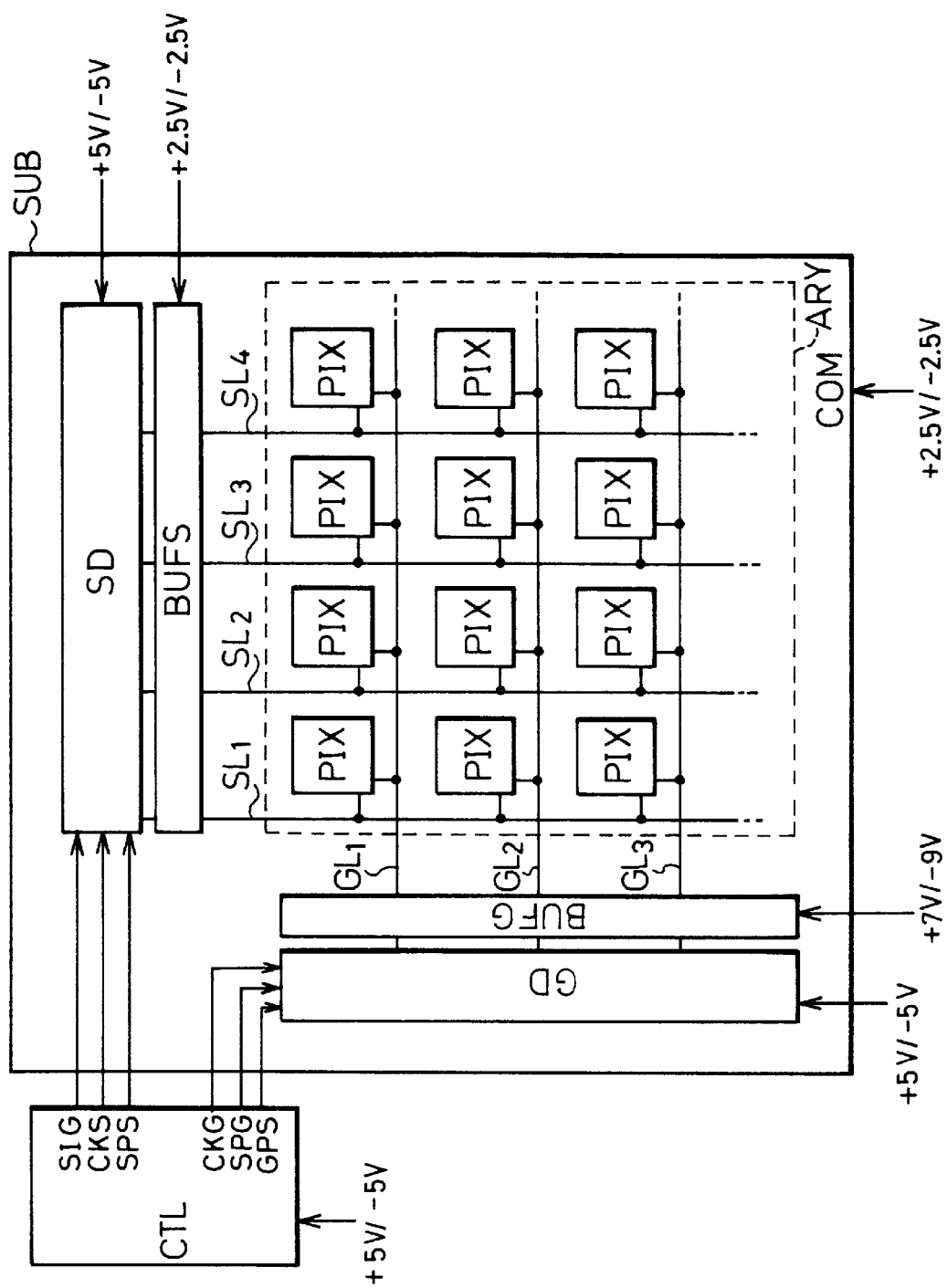
FIG. 18 is a configuration view showing an active matrix type liquid crystal display device of the eleventh embodiment.

FIG. 18 is a drawing showing a configuration example of an active matrix type liquid crystal display device of the present embodiment.

An external control circuit CTL is connected to the data signal line driving circuit SD and the scanning signal line driving circuit GD of the liquid crystal display device. The data signal line driving circuit SD is connected to data signal lines SLs via a buffer section BUFS, while the scanning signal line driving circuit GD is connected to scanning signal lines GLs via a buffer section BUFG.

The external control circuit CTL (at least its outputting section) is driven by a 10V power source. The input signal into the data signal line driving circuit SD and the scanning signal line driving circuit GD is of a 10V amplitude (+5V/−5V). Here, the input signal into the data signal line driving circuit SD is, for example, the digital image signal SIG, the clock signal CKS and the start signal SPS, whereas the input signal into the scanning signal line driving circuit GD is, for example, the clock signal CKG, the start signal SPG and the pulse signal GPS.

The data signal line driving circuit SD except the buffer section BUFS is driven by a 10V power source. So is the scanning signal line driving circuit GD except the buffer section BUFG. A 5V power source (+2.5V/−2.5V) is supplied to the buffer section BUFS in accordance with the liquid crystal driving voltage. A 16V power source (+7V/−9V) is supplied to the buffer section BUFG in accordance with the scanning signal line amplitude that is necessary for writing and storing the pixel charge. The opposite electrode COM is AC-driven by 5V (+2.5V/−2.5V) of the same amplitude as that of the liquid crystal application voltage as already mentioned in the description of the eighth embodiment.

Figure 19:
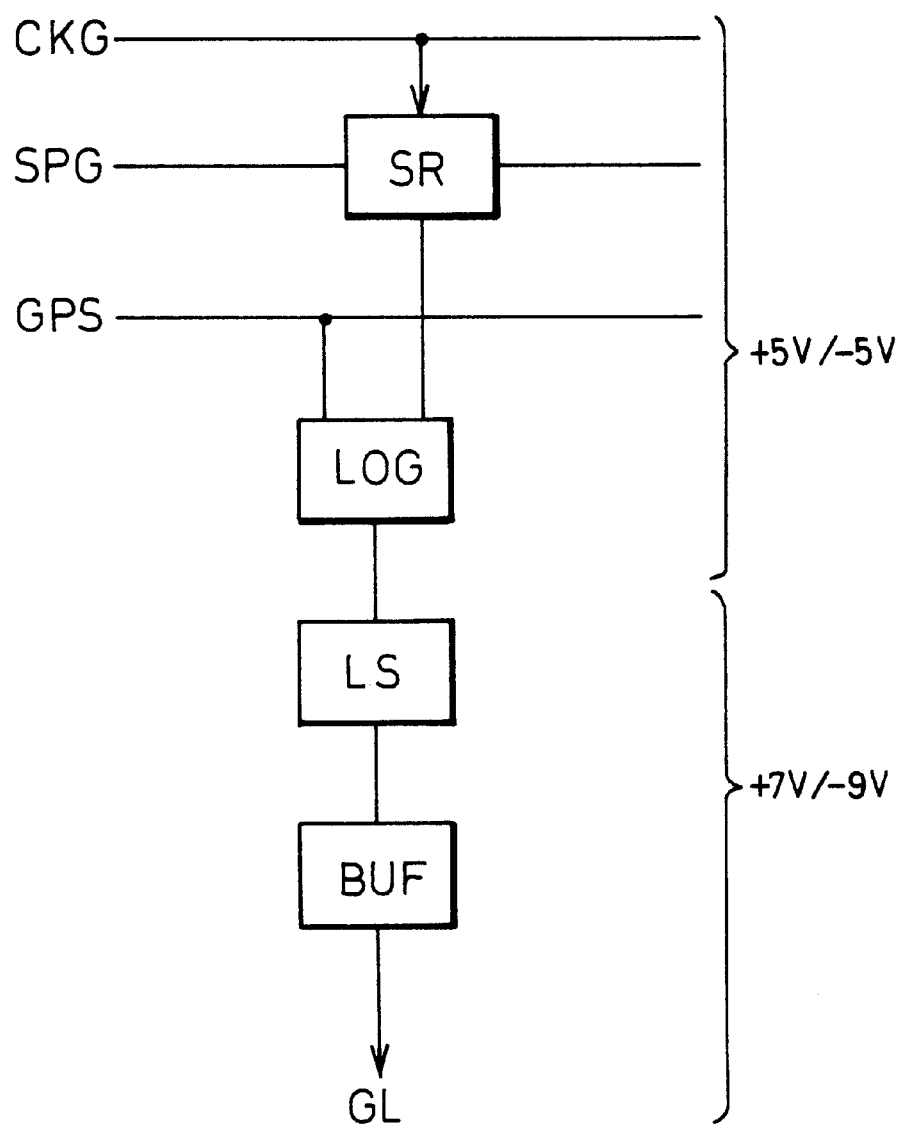
FIG. 19 is a configuration view showing a scanning signal line driving circuit of the liquid crystal display device.

To realize such a configuration, the scanning signal line driving circuit GD is provided with the scanning circuit SR, the logical circuit LOG, the level shifting circuit (level shifter) LS and the buffer circuit BUF, as shown in FIG. 19.

The pulse signal (+5V/−5V) obtained by carrying out a logical operation (AND) of the pulse signals and the output signals out of the stages of the scanning circuit SR with the logical circuit LOG is transformed by the level shifting circuit LS to a level (+7V/−9V) that can control the turning ON and OFF of the pixel switch, thereby driving the gate signal line GL via the buffer circuit BUF.

Since the present liquid crystal display device includes a scanning signal line driving circuit GD that incorporates a level shifting circuit LS, a desired output voltage (voltage of the scanning signal line) is obtainable regardless of the level of the input signal. Therefore, the input signal of the scanning signal line driving circuit GD and that of the data signal line driving circuit SD can have the same level. Since the output levels of the external control circuits CTLs can be unified with this configuration, it is expected that the system including the power source circuit and the like is simplified and less power is consumed.

[TWELFTH EMBODIMENT]

Figure 20:
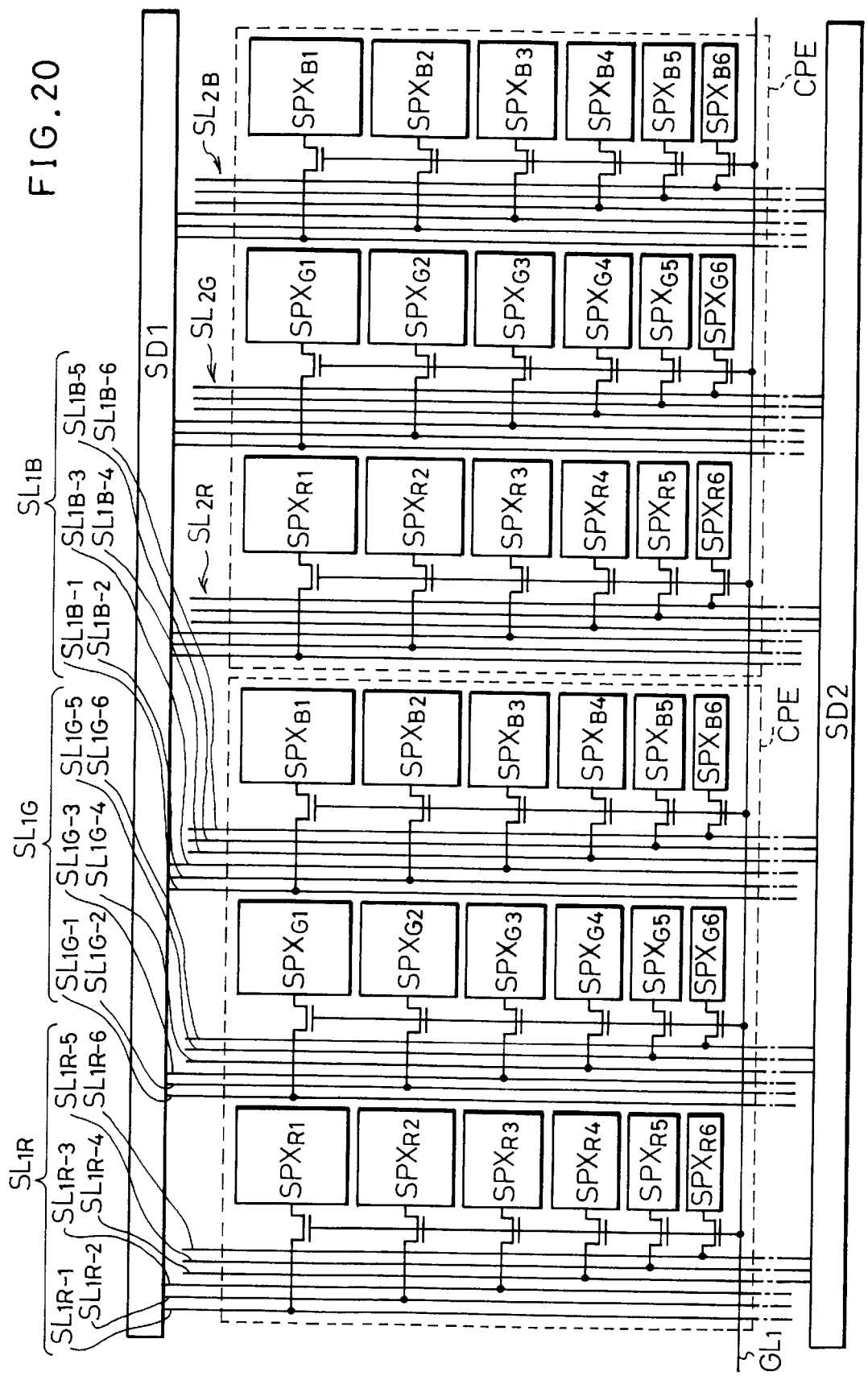
FIG. 20 is a configuration view showing a configuration example of pixels and data signal lines of an active matrix type liquid crystal display device of the twelfth embodiment.

FIG. 20 is a drawing showing a configuration example of pixels of an active matrix type liquid crystal display device of the present embodiment. This is a configuration to expand the connection pitches of the data signal lines when the resolution and the number of the gray scales need to be increased as in the case of the aforementioned sixth embodiment.

Here, for convenience, the following description only explains the features that are unique to the present embodiment. The features that are shared between the present and sixth embodiments will be omitted from the description.

The liquid crystal display device of the present embodiment and that of the sixth embodiment (see FIG. 13) share the same configuration in terms of the first and second data signal line driving circuits SD1 and SD2 and the picture elements CPE. The same number of data signal lines SLs are connected to the two data signal line driving circuits SD1 and SD2 as in the configuration shown in FIG. 13, albeit, in a different manner.

To be more specific, in the liquid crystal display device of the sixth embodiment shown in FIG. 13, the picture elements (each composed of three pixels corresponding to RGB) are connected alternately to the data signal line driving circuit SD1 and to the data signal line driving circuit SD2 via the data signal lines SLs. In contrast, in the liquid crystal display device of the present embodiment shown in FIG. 20, each picture element is connected to both the data signal line driving circuit SD1 and the data signal line driving circuit SD2 via the data signal lines corresponding to the upper half bits of the pixels (e.g., $SL_{1R-1}$, $SL_{1R-2}$, $SL_{1R-3}$) that are connected to the first data signal line driving circuit SD1 and via the data signal lines corresponding to the lower half bits of the pixels (e.g., $SL_{1R-4}$, $SL_{1R-5}$, $SL_{1R-6}$) that are connected to the second data signal line driving circuit SD2.

As a result, different digital image signals are inputted to the two data signal line driving circuits in the configuration shown in FIG. 20, whereas the same image signals need to be inputted into the two data signal line driving circuits in the configuration shown in FIG. 13. Therefore, the present embodiment needs less image signal lines, allowing the data signal line driving circuits to be reduced in size.

Note that the distribution of the digital image signals to the two data signal line driving circuits is not constrained in the least. The configuration shown in FIG. 20 is given as a mere example of possible distributions.

[THIRTEENTH EMBODIMENT]

Figure 21:
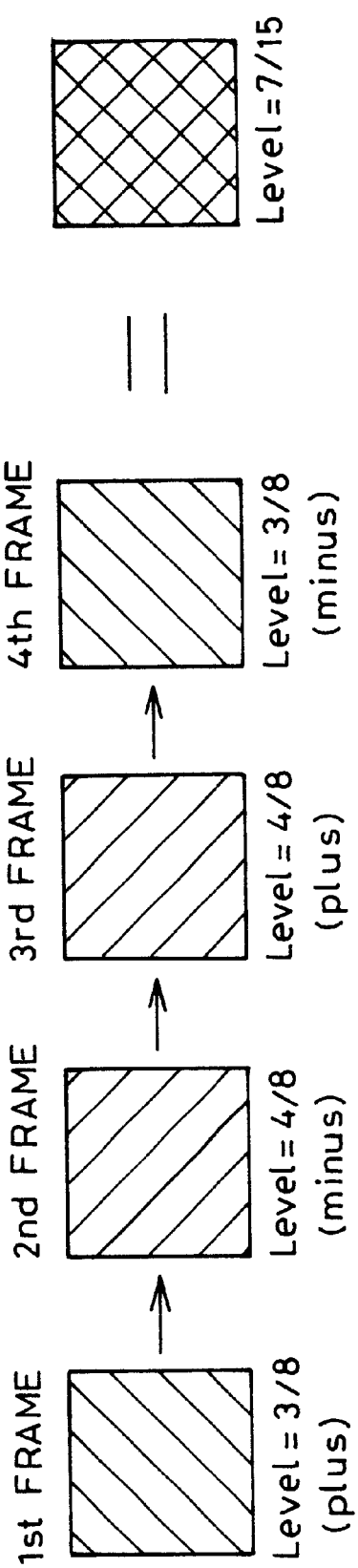
FIG. 21 is an explanatory view showing how an active matrix type liquid crystal display device of the thirteenth embodiment performs half-tone display with a frame modulation method.

FIG. 21 is a drawing showing how an active matrix type liquid crystal display device of the present embodiment performs half-tone display. The eight gray scales are denoted as levels 0 through 7, while the fifteen gray scales are denoted as levels 0 through 14.

FIG. 21 shows a time series of gray scales displayed with a pixel. Fifteen gray scales are effected with a pixel composed of three subpixels (in correspondence to eight gray scale display), utilizing two frames (four frames if the polarity of the signal is taken into account). A pixel composed of three subpixels alone cannot display more than eight gray scales. However, if used in combination with a plurality of frames, such a pixel can display gray scales between those eight gray scales (frame modulation method).

In this example, level 7 of the fifteen gray scales, which corresponds to the gray scale between level 3 and level 4 of the eight gray scales, is simulatively displayed by repeatedly displaying level 3 and level 4 of the eight gray scales.

Generally, employing the frame modulation method causes in many cases the frequency of display changes to decrease and flickering to become conspicuous. As a result, a measure, for example, of increasing the frame frequency, must be taken to suppress these phenomena. However, with a liquid crystal display device having a small contrast ratio (e.g., a reflection type liquid crystal display device), flickering does not much affect the displayed image, eliminating the need for such a measure. For these reasons, such a liquid crystal display device benefits much from this driving method.

[FOURTEENTH EMBODIMENT]

Figure 22:
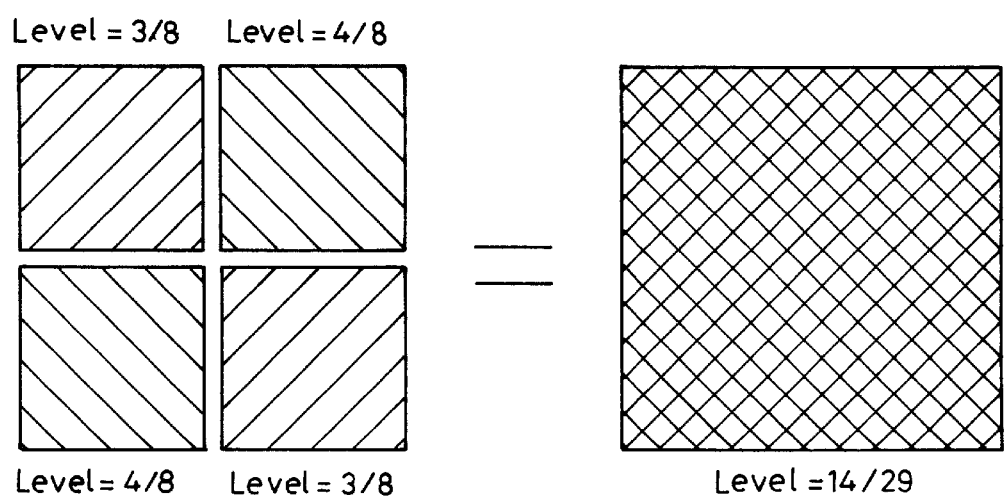
FIG. 22 is an explanatory view showing how an active matrix type liquid crystal display device of the fourteenth embodiment performs half-tone display with a dither method.
Figure 24:
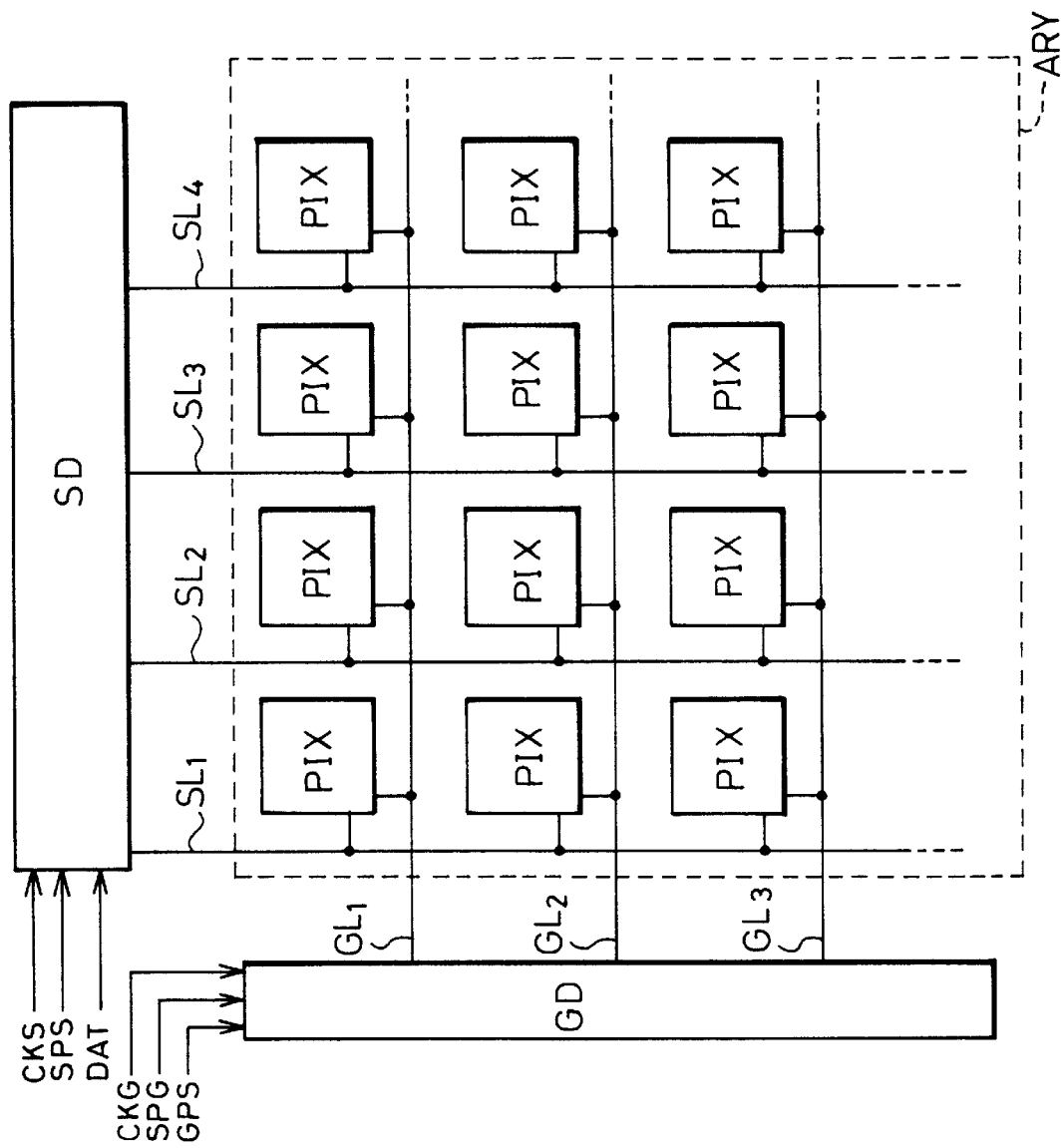
FIG. 24 is a configuration view showing a conventional active matrix type liquid crystal display device.
Figure 25:
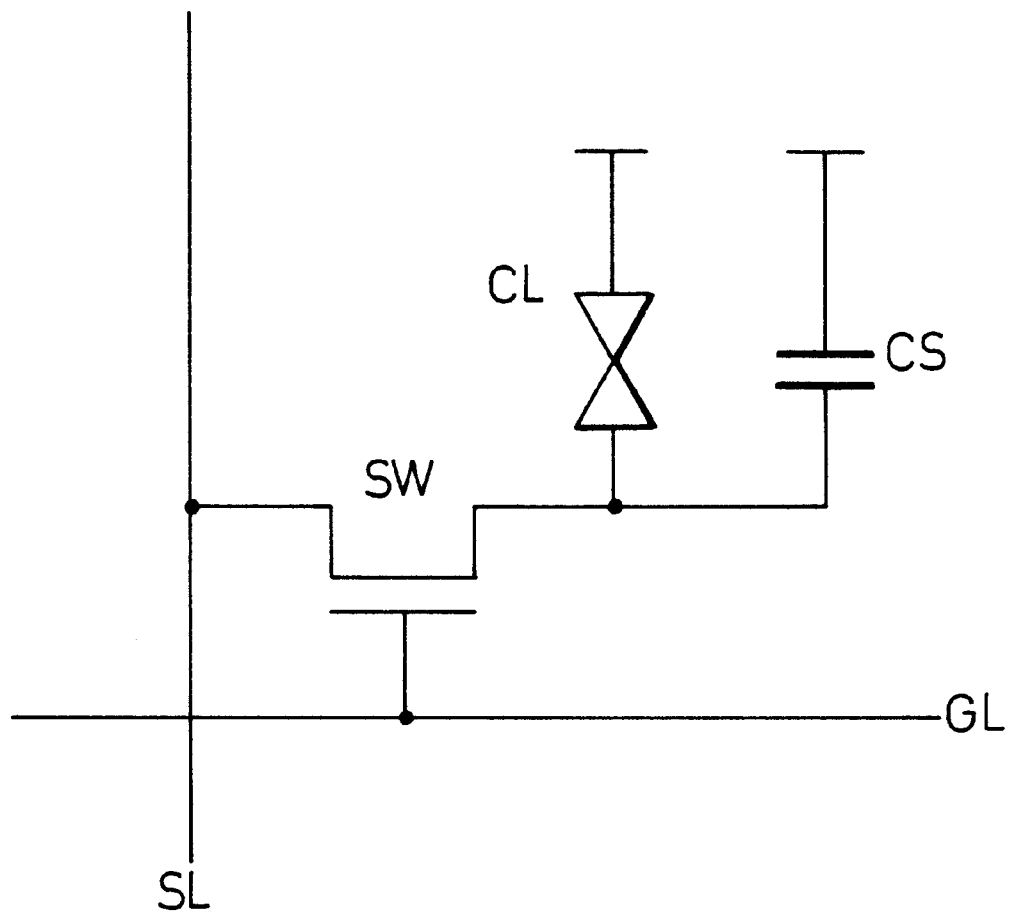
FIG. 25 is an explanatory view showing an internal structure of a pixel of the liquid crystal display device shown in FIG. 24.
Figure 26:
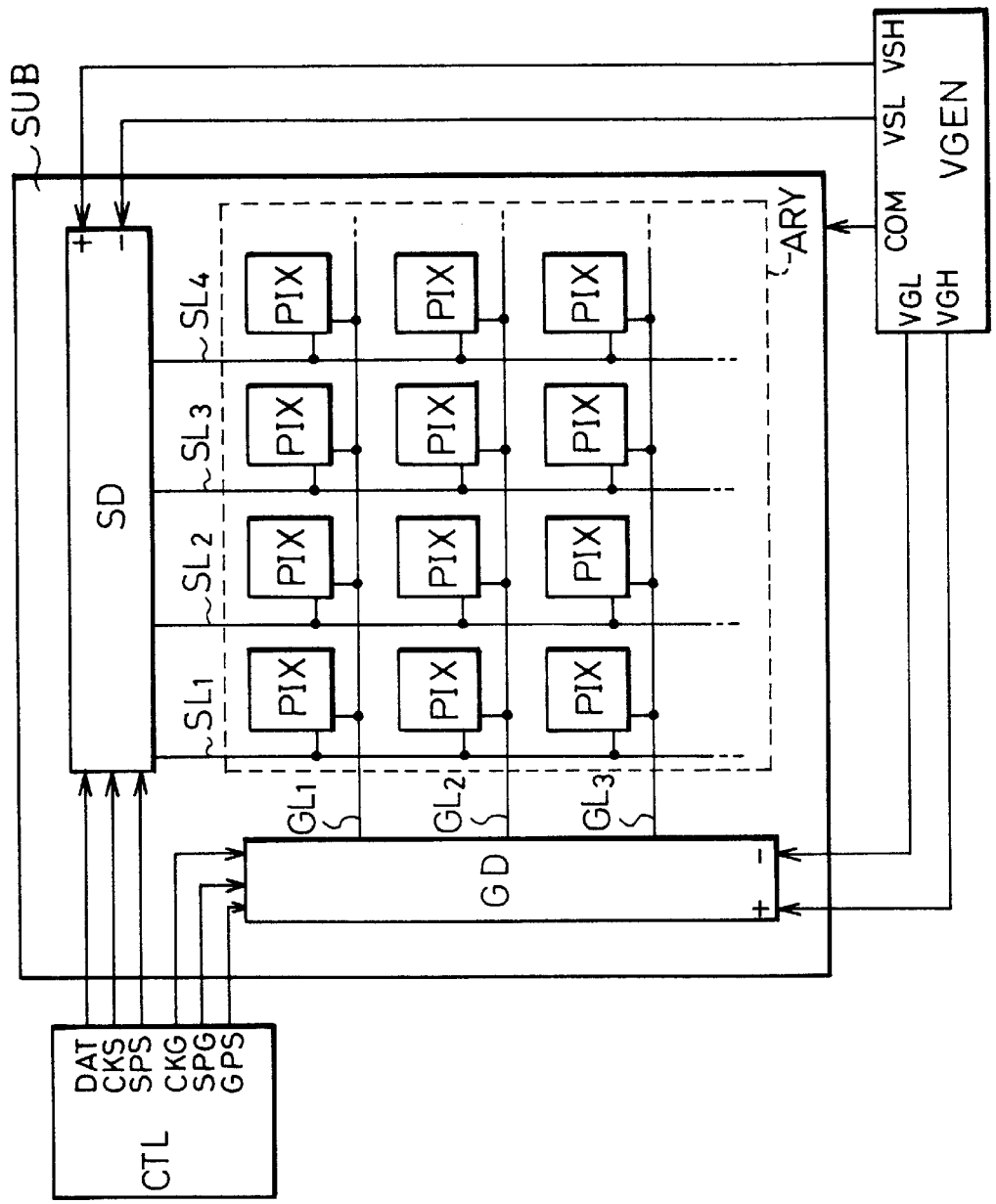
FIG. 26 is another configuration view showing the conventional active matrix type liquid crystal display device.
Figure 27:
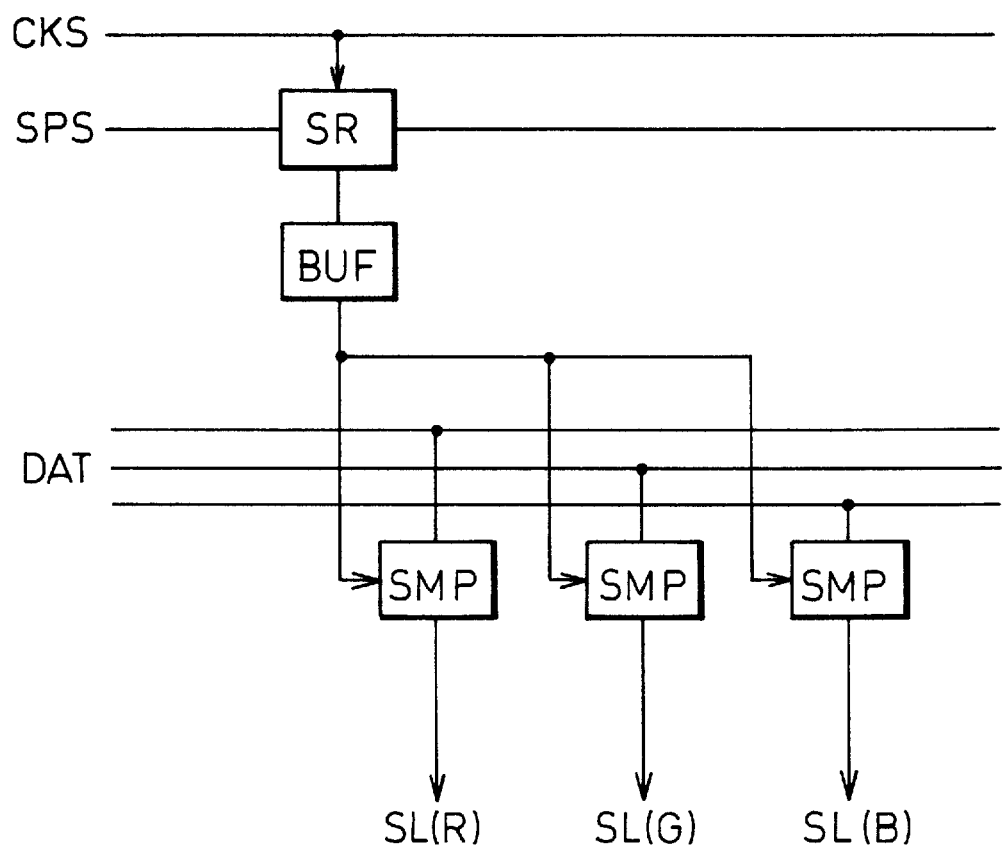
FIG. 27 is a configuration view showing a conventional data signal line driving circuit of a point-to-point successive driving method.

FIG. 22 is a drawing showing how an active matrix type liquid crystal display device of the present embodiment performs half-tone display. The eight gray scales are denoted as levels 0 through 7, while the twenty-nine gray scales are denoted as levels 0 through 28.

FIG. 22 shows gray scales displayed with a plurality of neighboring pixels (four pixels in this example). Twenty-nine gray scales are effected with pixels, each of which is composed of three subpixels (in correspondence to eight gray scale display). A pixel composed of three subpixels alone cannot display more than eight gray scales. However, if used in combination with other pixels, such pixels can display gray scales between those eight gray scales (dither method).

In this example, level 14 of the twenty-nine gray scales is simulatively displayed as a whole by carrying out display of three gray scales between level 3 and level 4 of the eight gray scales with the four pixels that display level 3 and level 4.

Generally, employing the dither method causes the resolution to decline. However, this method is effective, for example, when a priority is given to the displayed gray scales rather than to the resolution, and more effective when the arrangement pitches of the pixels are sufficiently small that the decline of the resolution due to the dither method is not recognized.

[FIFTEENTH EMBODIMENT]

FIGS. 23(*a*) through 23(*k*) are cross-sectional views showing an example of steps in processing of a thin film transistor composing an active matrix type liquid crystal display device of the present embodiment.

First, an amorphous silicon thin film 22 (see FIG. 23(*b*)) deposited on a glass substrate 21 (see FIG. 23(*a*)) is irradiated with excimer laser to form a polycrystal silicon thin film 23 (see FIG. 23(*c*)). Next, the polycrystal silicon thin film 23 is patterned into a desired shape (see FIG. 23(*d*)) and then a gate insulating film 24 of silicon dioxide is formed (see FIG. 23(*e*)). After forming a gate electrode 25 of a thin film transistor (FIG. 23(*f*)) from aluminum and the like, impurity ions (phosphorous ions for the n-type region, and boric ions for the p-type region) are injected into source and drain regions 26 of the thin film transistor (see FIGS. 23(g) and 23(h)). Thereafter an interlayer insulating film 27 made of silicon dioxide, silicon nitride, or the like is deposited (see FIG. 23(i)). A contact hole 28 is then opened (see FIG. 23(j)), and metal wiring 29 of aluminum and the like is formed (see FIG. 23 (f)) Throughout these steps, since the highest temperature in processing is 600° C. when the gate insulating film is formed, highly heat-resistant glass, such as 1737 glass made by Corning Inc. of the United States of America, can be used.

As for a liquid crystal display device, for example, a transparent electrode (for a transparent liquid crystal display device) or a reflection electrode (for a reflection type liquid crystal display device) is formed through the interlayer insulating film.

Since polycrystal silicon thin film transistors can be formed on a cheap glass substrate that can offer a large display area with the processing, it is easy to reduce the cost and increase the size of the liquid crystal display device.

Polycrystal silicon thin film transistors formed at such a relatively low temperature have disadvantages in its incorporation into a circuit: for example, a small driving capability, a large size, and non-uniform properties. However, these problems can be ignored to some extent by adopting the aforementioned area gray scale display method.

(1) As mentioned so far, the active matrix type liquid crystal display device in accordance with the present invention includes:

a plurality of data signal lines arranged in one direction;

a plurality of scanning signal lines arranged in a direction crossing the plurality of data signal lines; and a plurality of pixels provided in a matrix form, wherein a data signal line driving circuit for supplying an image signal to the plurality of data signal lines, and a scanning signal line driving circuit for supplying a scanning signal to the plurality of scanning signal lines are composed of polycrystal silicon thin film transistors that are formed on the same substrate as are the plurality of pixels, wherein each of the plurality of pixels is composed of a plurality of subpixels, and the plurality of subpixels are driven by a binary display.

The liquid crystal display device is an image display device integrated with a driving circuit composed of polycrystal silicon thin film transistors, adopting an area gray scale display method of changing the area of display regions with an image signal corresponding to a binary display. Therefore, the liquid crystal display device produces various effects as described in detail below, including improvement in tolerance against the non-uniform properties and noise of elements, simplified system, reduction in the power consumption, realization of mounting of the data signal line driving circuit, reduction in cost of the driving circuit section, simplified inspection, and lower cost.

According to the area gray scale display method, image signals corresponding to a binary display are written into the electrodes of the subpixels. Therefore, a small variation in the applied voltage can be prevented from affecting the display image, by setting the applied voltage to a voltage value in the proximity of which the orientation of the liquid crystal (i.e., transmittance and reflectance of the liquid crystal) changes little upon application.

The tolerance against a leak current of pixel transistors, non-uniformities in output voltages of the output lines of the data signal line driving circuit (caused by non-uniform properties of the output transistors), and the like is thus improved. Especially, the polycrystal silicon thin film transistor exhibits a larger leak current than an amorphous silicon thin film transistor, and larger non-uniformities in its properties, such as a threshold voltage, than a monocrystal silicon thin film transistor. For these reasons, a great improvement is expected in yield with a liquid crystal display device integrated with a driving circuit formed on a polycrystal silicon thin film adopting this display method.

To be a little more specific, since a drive IC using monocrystal silicon suppresses the output variations to the data signal line driving circuit not to exceed 5 to 20 mV, the problem is not conspicuous no matter which driving method is employed. However, the threshold voltage of a polycrystal silicon thin film transistor varies in some cases more than several hundred mV. Such a variation may cause stripes to appear in the displayed image and the gray scales to be inverted, if the driving method employed for gray scale display uses an intermediate voltage (e.g., the aforementioned analogue method and multiplexer method). With this disadvantages of the conventional methods in mind, the advantages of the driving method using a binary display for gray scale display as introduced in the present invention are better appreciated.

Since image signals corresponding to a binary display are inputted, and thereby a small variation in the applied voltage can be prevented from affecting the display image, the area gray scale display method are effective against the follows disturbances: for example, attenuation and rounding of image signals along signal lines, crosstalk between signal lines, crosstalk between a signal line and a pixel electrode, non-uniform liquid crystal thickness, changes in properties of a transistor and those of liquid crystal due to changes in environment such as temperature, and changes in properties of a transistor and those of liquid crystal over a period of time.

The area gray scale display method, since using image signals corresponding to a binary display, does not need to supply an intermediate voltage unlike the aforementioned analogue method and multiplexer method. Therefore, the area gray scale display method produces effects of not requiring a power-consuming D/A converter, amplifier and gray scale voltage generating circuit, of simplifying the configuration of the external power source circuit, and hence of reducing the power consumption thereof. Especially, portable information terminals that have been in widespread use in recent years internally processes information with digital signals, thereby outputting digital signals to the display device as well. The present method, according to which the image is imputed as digital signals, eliminates the need for DA conversion which is essential with an analogue method, reducing the cost and power consumption of the system by a large amount.

The area gray scale display method has other advantages in terms of power consumption, as a result of the integration of the driving circuit. The following description explains the reasons.

A conventional analogue type image display device of a point-to-point successive method needs to suppress, among the other impedances, the total impedance of the output impedance of the external image signal outputting circuit and the resistance of the driving circuit outputting section not to exceed a certain value, in order to write the image signal into the data signal lines with appropriate precision in a predetermined period of time.

The polycrystal silicon thin film transistor has a driving ability much inferior (by more than two digits in mutual conductance per channel width) to that of a monocrystal silicon transistor. Therefore, when the driving circuit is integrated using the polycrystal silicon thin film transistor, even if a thin film transistor of a large size is used, the driving circuit has much inferior write-in ability to a drive IC (the resistance of the drive circuit outputting section becomes larger).

Therefore, the output impedance of the external image signal outputting circuit needs to be decreased by an amount that matches it, which increases stationary current in the image signal outputting circuit and results in a larger power consumption. In other words, at present, the integration of a driving circuit with an analogue type image display device of a point-to-point successive method, which is the only commercialized display device integrated with a driving circuit, is likely to result in an increase in power consumption of the external circuit.

By contrast, according to the area gray scale display method, a sufficiently long write-in time is set aside as will be mentioned later, and therefore the output impedance of the external circuit does not need to be decreased in integration of a driving circuit. On the contrary, locating the driving circuit and the pixel array in close proximity and integrating them decreases the parasitic capacity in that part, contributing to a reduction in the power consumption.

If the configuration of a pixel divided into a plurality of subpixels is to be applied to a combination of a drive IC and a pixel array composed of amorphous silicon thin film transistors, mounting is in some cases impossible. Such a problem does not arise with the liquid crystal display device integrated with a driving circuit using polycrystal silicon thin film transistors.

That is, in this display method, the divided subpixels need to be of such a size that each subpixel is not visually recognized as an individual pixel. For example, supposing that the pixel is of the same size as in the panel widely used at present (12.1-inch SVGA panel having picture elements, each composed of RGB pixels, of about 300 $\mu$m by 300 $\mu$m), even if the pixel is divided into two subpixels, and if the data signal line driving circuit is disposed only on one side of the pixel array, the arrangement pitches of the data signal lines corresponding to the subpixels are about 50 $\mu$m. If the pixel is divided into three subpixels, the arrangement pitches are about 33 $\mu$m. The smallest wiring pitch available with present mounting techniques is 50 to 70 $\mu$m. A display device with a better precision-to-displaypanel-size ratio than this is only possible with the driving circuit formed integrally with the pixel array.

Next, the following description will explain the total cost of the pixel array and the driving circuit.

If the area gray scale display method is to be effected with a conventional drive IC and a pixel array composed of amorphous silicon thin film transistors, the cost of the drive IC and of mounting increases by a large amount, losing cost-competitiveness for the following reasons. Generally the cost of an IC is proportional to the chip area. Since the IC for driving liquid crystal has many output terminals in regard of its circuit size, the chip area thereof tends to depend on the number of terminals (or more precisely the arrangement of the pads). Data signal output pads increase in number (three times in the case of three bits) according to the area gray scale display method, compared to conventional driving methods (analogue method and multiplexer method). The chip area increases accordingly, resulting in a higher cost. The cost of mounting also increases with an increasing number of connecting terminals (three times in the case of three bits).

By contrast, as for the display device integrated with a driving circuit, since the cost of the drive circuit section depends on the area occupied by the circuit, not on the number of output lines, adoption of the area gray scale display method does not result in an increase in the cost. On the contrary, as will be described in detail later, the driving circuit is simplified and occupies a smaller area than those of other driving methods, which reduces the cost.

Therefore, integration of the driving circuit is very effective to effect the area gray scale display method without increasing the cost of the driving section. In other words, a cost reduction effect by integrating the driving circuit is about the number of bits times (three times in the case of three bits) larger for the area gray scale display method than for other driving methods. This is an effect uniquely produced by a combination of the area gray scale display method and the integration techniques of driving circuits.

There is another advantage of improving the inspection of the pixel array and the drive circuit in speed and reliability. The operations of the pixel array and the driving circuit of a liquid crystal display device incorporating a driving circuit can be easily checked by externally inputting an inspection signal into the driving circuit and monitoring, for example, potentials of the signal lines.

Especially, with the area gray scale display method, since image signals correspond to a binary display, small variations in the signal voltage do not need to be detected. That is, conventionally, when half-tone display is carried out with analogue voltage, since small variations in the image signal, for example, variations caused by a leak current, crosstalk, waveform rounding, etc. affect the display, even a very small signal voltage difference must be detected. If such a difference cannot be detected, the reliability of the inspection is deemed low. However, the area gray scale display method does not require high precision in the signal detection (not completely digital). Therefore, according to the area gray scale display method, almost all the defects can be detected quickly.

(2) The aforementioned active matrix type liquid crystal display device is preferably configured so that the data signal lines respectively corresponding to the subpixels are connected to the data signal line driving circuit so as to have an average pitch not exceeding 50 $\mu$m.

Since the aforementioned liquid crystal display device is configured so that the data signal lines are connected to the data signal line driving circuit so as to have an average pitch not exceeding 50 $\mu$m, an image display device with a better precision-to-display-panel-size ratio that is impossible with present mounting techniques can be realized as mentioned above. When a pixel is divided into a plurality of subpixels (n subpixels) in an area gray scale display method, since each subpixel needs an independent data signal line, the arrangement pitch of the data signal lines becomes 1/n that of conventional pixel arrangements to achieve the same resolution. Meanwhile, the data signal lines and the driving circuit of a conventional liquid crystal display device with an externally provided driving circuit IC need to be electrically connected, and TCP (Tape Carrier Package) is typically used for this purpose. However, the smallest pitch with which mounting can be carried out is 50 to 70 $\mu$m. Therefore, if the average pitch of the subpixels are smaller than this, the mounting becomes difficult. Therefore, in a case that the average arrangement pitch of the data signal lines is 50 $\mu$m or narrower, it is very effective to form the driving circuit and the pixel array on the same substrate.

(3) The aforementioned active matrix type liquid crystal display device is preferably configured so that the data signal line driving circuit is composed of a scanning circuit (shift register circuit), latch-in circuits and outputting circuits.

Since the aforementioned liquid crystal display device is configured so that the data signal line driving circuit is composed of a scanning circuit, latch-in circuits and outputting circuits, the circuit becomes smaller and occupies less area, making it possible to reduce the cost, architrave area and power consumption. Besides, the transistors composing the driving circuit can be reduced in size, making it possible to improve reliability.

A conventional multiplexer digital driving method requires almost one horizontal scanning period to write an intermediate voltage with high precision. However, the area gray scale display method only requires a horizontal blanking period, because the display method only needs to write a voltage corresponding to a binary display and tolerates non-uniformities (e.g., variations and inadequate write-in) to some extent as mentioned above. Therefore, the area gray scale display method does not require a transfer circuit that is essential to the multiplexer method to transfer the signals for the one horizontal scanning period all together.

Meanwhile, the data signal lines have a capacity of more than several pF, and it is difficult to charge them within the period of the output pulse width of the shift register circuit. Therefore, it is effective to include latch-in circuits of input small capacities and to store digital image signals at least until the end of the horizontal blanking period (actually, until image signals for a next horizontal scanning period are inputted).

This configuration allows thin film transistors composing the data signal line driving circuit to be of the smallest size (smallest channel width), and still to have a sufficient write-in ability for the area gray scale display method. On the other hand, an analogue type image display device of a point-to-point successive method requires the sampling circuit (analogue switch) of a very large size (channel width) in the outputting section, because the data signal lines need to be charged within the period of the output pulse width of the shift register circuit. As for a digital type image display device of a multiplexer method, the configuration of the circuit is also complex (needs decoder circuits and analogue switches), occupying a considerably large area. The area gray scale display method, as described above, allows the data signal line driving circuit to be configured relatively easily with transistors of the smallest size, and hence to occupy a smaller area. As a result, the manufacturing cost is reduced, and it is expected that the power consumption is reduced due to a smaller architrave area on the data signal line driving circuit side and a reduced load capacity of the driving circuit section.

Moreover, the data signal line driving circuit of the area gray scale display method, since requiring no transistor of a large size, is more reliable. A thin film transistor is surrounded by insulating material and tends to engulf generated heat in comparison with a transistor on a monocrystal substrate, which may eventually destruct the thin film transistor. The generated heat is proportional to the current flowing through the transistor. Therefore, as for the area gray scale display method including only transistors of the smallest size, the deterioration and destruction by heat is less likely to occur, and reliability is improved.

(4) The aforementioned active matrix type liquid crystal display device is preferably configured so that the liquid crystal display device has a display contrast ratio not exceeding 15:1, and the polarity of the image data applied to the subpixels is inverted for every frame.

Since the aforementioned liquid crystal display device has a display contrast ratio not exceeding 15:1, flickering is not conspicuous. As a result, a frame inversion driving method that is effective in reducing the power consumption can be used without degrading the display quality.

Generally, a liquid crystal display device using material with which dielectric polarization occurs in the presence of an external electric field, such as nematic liquid crystal, is AC-driven to ensure reliability, and the period of the AC-driving is set to one horizontal scanning period (e.g., approximately 32 microseconds for a VGA panel) or one dot period (e.g., approximately 40 nanoseconds for a VGA panel) to suppress the flickering of the image. Meanwhile, an effect of reducing the power consumption can be expected by setting the period to one frame period (e.g., approximately 16.7 milliseconds for a VGA panel).

Besides, when the contrast ratio is small, since the number of distinguishable gray scales is small, the difficulty in increasing the number of gray scales that can be displayed with the area gray scale display method is not a serious problem. That is, the corresponding number of subpixels to the number of the gray scales and the data signal line driving circuit do not need to be provided in a limited area. For example, as for the transparent liquid crystal display device that is widely applied for use in notebook type personal computers at present, the contrast ratio is a bout 200:1, and the number of distinguishable gray scales is 128 to 256 gray scales. Inferring from this, it is estimated that the liquid crystal display device having a contrast ratio of 15:1 can produce no more than 9 to 19 distinguishable gray scales. Therefore, it is estimated that the degradation of the quality of displayed images due to dividing the pixel into only three subpixels (corresponding to eight gray scales) does not pose a serious problem.

(5) The aforementioned active matrix type liquid crystal display device is preferably configured so that the electrode of the subpixel is formed to cover the switching element composing the subpixel and reflects radiating light.

Since the aforementioned liquid crystal display device is configured so that the reflection electrode is formed to cover the switching element of the subpixel, it is possible to increase the aperture ratio by a large amount, and to realize a bright reflection type liquid crystal display device with a large contrast ratio. According to the area gray scale display method, since a pixel is divided into a plurality of subpixels, the switching element occupies more of the area of a subpixel. With a transparent liquid crystal display device, since light is blocked where the switching element is provided, the aperture ratio is likely to drop greatly. However, a reflection type liquid crystal display device can be arranged so as to reduce the aperture ratio only by a small amount by forming the reflection electrode above the switching element.

Also, if the reflection type liquid crystal display device is for direct viewing, the contrast ratio is generally small (not exceeding 15:1 as already described, in most cases). Therefore, such a reflection type liquid crystal display device produces the same effects as those produced by the configuration (4).

(6) The aforementioned active matrix type liquid crystal display device is preferably configured so that the area ratios of the subpixels composing a pixel are 2, the pixel is composed of three subpixels, and the color display is carried out by constituting one picture element with the three pixels that correspond to red, green and blue colors.

Since the aforementioned liquid crystal display device is configured so that the area ratios of the subpixels composing a pixel are 2 (the areas of the subpixels composing a pixel is $1:2:2^2: \ldots :2^{n-1}$), any of the $2^n$ gray scales can be displayed with the smallest number of subpixels. In addition, in this case, the signal for driving the subpixel directly corresponds to an inputted digital image signal. Therefore, there is no need to carry out an operation step in the data signal line driving circuit, greatly simplifying the configuration of the circuit.

Also, the liquid crystal display device, having a display ability of 512 colors by configuring each pixel with three subpixels, can display 256 to 512 colors, which is suitable for use with a portable device. The number of colors displayed by a portable device is set in many cases to 256 to 512 because of a strong demand to reduce the quantity of image data and to eventually reduce the size of circuits. Especially for reduction in the power consumption, the band width of the operation processing section is set in many cases to one byte (eight bits). In those cases, the number of colors displayed is 256 (=eight bits).

Moreover, as described above, the number of distinguishable gray scales is limited with a display device of a low contrast, it is meaningless to provide such a display device with a better display ability. Accordingly, in such a case, display of eight gray scales (three bits) is sufficiently good.

Display of more gray scales is possible if each pixel is divided into a plurality of subpixels. However, more data signal line driving circuits, data signal lines and pixel switches will be needed, which makes it difficult to arrange them in the same area. As described above, the pixels cannot be too big to realize an excellent display performance. Hence, dividing a pixel into about three subpixels is realistic.

Furthermore, since a picture element is configured with the three pixels corresponding to red, green and blue colors, a bright color display is possible. As already mentioned, since a reflection type liquid crystal display device needs a switching element for every pixel, preferably, the areas occupied by the switching elements are also used as display areas to increase the aperture ratio. Therefore, a method of configuring a picture element with three pixels respectively corresponding to the primary colors and disposing color filters in corresponding areas is more effective than a method of carrying out color display by stacking a plurality of transparent panels respectively corresponding to the primary colors.

(7) The aforementioned active matrix type liquid crystal display device is preferably configured so that the area ratios of the subpixels composing a pixel are 2, the data signal line driving circuit is divided into two parts and disposed on opposite sides of the pixel array, the pixel is composed of six subpixels, and the color display is carried out by constituting one picture element with the three pixels that correspond to red, green and blue colors.

It is expected that the aforementioned liquid crystal display device produces the same effects as those produced by the configuration (6). The following description will therefore explain only unique features of the configuration (7).

Here, the liquid crystal display device, having a pixel configured with six subpixels, has a display ability of 262144 colors. Since the data signal line driving circuit is divided into two parts and disposed on opposite sides of the pixel array, the arrangement pitches for the data signal line driving circuits are widened, which increases the number of disposed subpixels up to double the number of a case that the data signal line driving circuit is disposed only on one side. The number of gray scales can be further increased in this manner.

At present, there is a growing demand for display devices suited to multimedia use. Considering that reproduction of a natural image like a television image requires approximately 260 thousand display colors, the configuration is particularly effective.

A reflection type liquid crystal display device for image projection requires a high contrast ratio, and hence a display ability of more than 260 thousand colors. So, the configuration is particularly effective for this use as well.

The pixels may be divided into a different number of subpixels, apart from three as in examples shown in (6) and (7). For example, pixels, each of which is divided into four subpixels, would be appropriate for a system requiring display of 4096 colors. If image data in a system is of two bytes (sixteen bits), display of 65536 colors (=sixteen bits) is required (each of RGB is of five to six bit display). In this case, whether the data signal line driving circuit is provided only on one side of the pixel array, or is divided into two parts and disposed on opposite sides of the pixel array depends upon the array pitches and layout rules.

(8) The aforementioned active matrix type liquid crystal display device is preferably configured so that the opposite electrode for the pixels is AC-driven with the same amplitude as that of the driving voltage for the liquid crystal element, and the data signal line driving circuit is composed of a logical circuit.

Since the aforementioned liquid crystal display device is configured so that the opposite electrode for the pixels is AC-driven with the same amplitude as that of the driving voltage for the liquid crystal element, power consumption can be further reduced.

Generally, the power consumption of a circuit is proportional to the driving frequency and the square of the driving voltage. As for the liquid crystal display device, the operating frequency of the data signal line driving circuit is several hundred times faster than that of the scanning signal line driving circuit, and therefore the data signal line driving circuit accounts for most of the total power consumption of the liquid crystal display device. If the driving voltage for the data signal line driving circuit can be reduced, the power consumption can be greatly reduced.

AC-driving the opposite electrode for the pixels with the same amplitude as that of, and with the phase opposite to that of, the driving voltage for the liquid crystal can reduce the amplitude of the image data written into the data signal line, and thus reduces the driving voltage for the circuit for outputting the image data. As a result, the power consumption can be further reduced.

In addition, since the image data of the positive polarity and that of the negative polarity are either of the two potential levels relative to the potential of the opposite electrode, the externally provided power source for the image data has only a high level and a low level (if the opposite electrode is driven with a constant voltage, or AC-driven with a different amplitude from that of the driving voltage for the liquid crystal element, a trinary or quaternary power source is necessary). Therefore, the configuration of the external power source circuit is simplified, and the power consumption thereof is greatly reduced.

In addition, since the area gray scale display method uses digital signals as the inputted image data, every input, including clock signals, is made by digital signals. Therefore, as described above, when the image output to the data signal lines is binary, the data signal line driving circuit can be configured only with a logical circuit (digital circuit). Of course, a level shifting circuit for shifting the voltage level of a signal may be built in as necessary.

A digital circuit does not need to handle a subtle potential difference, while an analogue circuit does. Therefore, the digital circuit better tolerates non-uniform properties of the elements and is expected to improve the non-defective ratio. Besides, a charge/discharge current and switching current are the only currents consumed by the digital circuit, and no stationary current flows through the digital circuit unlike the analogue circuit, which can greatly reduce the power consumption.

(9) The aforementioned active matrix type liquid crystal display device is preferably configured so that the polarity of the digital image signal inputted into the data signal line driving circuit is inverted in synchronization with the inversion period of the polarity of the voltage applied to the liquid crystal, and a signal corresponding to the inversion period of the polarity is not inputted into the outputting circuits composing the data signal line driving circuit.

Since the aforementioned liquid crystal display device is configured so that the polarity of the digital image signal inputted into the data signal line driving circuit is inverted in synchronization with the inversion period of the polarity of the liquid crystal driving voltage, the number of inputted signals and the size of the circuit can be reduced.

That is, if the digital image signal of a polarity corresponding to the inversion driving is inputted, the data signal line driving circuit does not need to invert the polarity of the image data, and therefore, no signal for controlling the polarity inversion needs to be inputted, reducing the number of input terminals. No circuit for controlling the polarity inversion is necessary either, reducing the size of the circuit. These are effective in reducing the power consumption, improving the non-defective ratio, and reducing the cost.

(10) The aforementioned active matrix type liquid crystal display device is preferably configured so that the driving voltages for the scanning circuit and the latch-in circuits of the data signal line driving circuit are higher than the voltage of the data signal outputted to the data signal lines, and the outputting circuit of the data signal line driving circuit includes an inverter driven by a lower voltage than the driving voltages for the scanning circuit and the latch-in circuits.

Since the aforementioned liquid crystal display device is configured so that the outputting circuit includes an inverter circuit to which a lower voltage is supplied than to other circuits, a data signal having an amplitude suitable for image display can be outputted with a very simple configuration.

Generally, polycrystal silicon thin film transistors have a high threshold voltage, and a large element size (channel length, gate insulating film thickness, etc.), and therefore needs a high driving voltage. Particularly, polycrystal silicon thin film transistors fabricated in low temperature processing at temperatures below 600° C. exhibit that tendency more clearly. It is estimated that polycrystal silicon thin film transistors need a driving voltage of approximately 8 to 20 V to ensure a sufficient operating speed. By contrast, the driving voltage for the liquid crystal element is approximately 3 to 7 V (both positive and negative). Besides, as already described, when the opposite electrode is AC-driven with the same amplitude as that of the liquid crystal driving voltage, the amplitude of the signal outputted to the data signal lines is 3 to 7 V.

Under these circumstances, it becomes possible to supply the image data having a desired voltage to the data signal lines with a relatively large driving force, by inputting the signal that is outputted by a latch-in circuit and that has a large amplitude (the same amplitude as that of the driving voltage for the polycrystal silicon thin film transistor) into an inverter circuit of a small supply voltage (the same power source voltage as the liquid crystal driving voltage). Besides, this is realized by a very simple configuration of making the drive power source for the output inverter circuit different from those for other circuits.

(11) The aforementioned active matrix type liquid crystal display device is preferably configured so that the scanning signal line driving circuit includes a level shifter, and the level of the input signal to the data signal line driving circuit is equal to the level of the input signal to the scanning signal line driving circuit.

Since the aforementioned liquid crystal display device is configured so that the scanning signal line driving circuit includes a level shifter, the levels of all the input signals to the liquid crystal display device are made equal to each other, alleviating the burden on an external interface circuit.

A voltage that enables the image signal to be inputted into, and stored by, the pixel is needed as an output level of the scanning signal line driving circuit (amplitude of the scanning signal line). Such a voltage depends on properties of the pixel transistors (threshold voltage, subthreshold coefficient, etc.), as well as on the amplitude of the image signal. Normally, the scanning signal line driving circuit needs an output level more than twice the value of the liquid crystal driving voltage, and therefore is driven with a higher voltage than is the data signal line driving circuit.

Here, the level of the input signal to the scanning signal line driving circuit can be varied to any level by incorporating a level shifter into the scanning signal line driving circuit. That is, the level of the input signal to the data signal line driving circuit can be made equal to the level of the input signal to the scanning signal line driving circuit, by driving only the output section of the scanning signal line driving circuit and the previous-stage part thereto with desired voltages (voltages required for the scanning signal lines) and by driving the rest with the same voltage as that for the data signal line driving circuit. As a result, the output of the external interface circuit has a single level, making it possible to reduce the number of the external power source circuits and level converting circuits, and simplifying the configuration.

Besides, the level of the input signal to the scanning signal line driving circuit is also made equal to the voltage level of the data signal line driving circuit whose voltage is lower. Consequently, the power consumption of the whole system can be reduced.

(12) The aforementioned active matrix type liquid crystal display device is preferably configured so that the data signal line driving circuit is divided into two parts and disposed on opposite sides of the pixel array, and the digital image signals corresponding to different subpixels are inputted into the data signal line driving circuits.

Since the aforementioned liquid crystal display device is configured so that the digital image signals of different bits are inputted into the data signal line driving circuits disposed on opposite sides of the pixel array, the driving circuit occupies a smaller area.

According to the area gray scale display method, the inputted digital image signals correspond to different data signal lines, and each of the digital image signals is outputted to its own data signal line irrelevantly to the other digital image signals. Therefore no problem arises from inputting, for example, the upper half bits to the data signal line driving circuit on the top side and the lower half bits to the data signal line driving circuit on the bottom side. On the contrary, that configuration reduces the area occupied by the data signal line driving circuits, since the digital image signals are not connected to both the data signal line driving circuits on the top and bottom sides. As a result, the image display device can be further reduced in size and in power consumption.

(13) The aforementioned active matrix type liquid crystal display device is preferably configured so as to increase the ostensible displayed gray scales with a frame modulation method.

The aforementioned liquid crystal display device enables more half-tones to be displayed than the gray scales corresponding to the number of the divided subpixels.

According to the area gray scale display method, since the pitches for the driving circuit, the pixel switches, etc. are decreased in accordance with the number of the subpixels, the number of the subpixels is limited, and thereby the number of the gray scales is limited. Therefore, if an image having more gray scales is to be displayed, the use of a frame. modulation method, which is a kind of pseudo gray scale display method, is effective. It is expected that the use will increase the number of gray scales corresponding to one to two bits. As will be described later, the gray scales that are really displayed are slightly less than these figures. For example, when a pixel is divided into three subpixels (corresponding to $8^3$=512 colors with an ordinary display method), 3375 (=$15^3$) colors can be displayed with modulation of two frames (four frames if the polarity is taken into account), and 24389 (=$29^3$) colors can be displayed with modulation of four frames (eight frames if the polarity is taken into account).

When the liquid crystal display device has a relatively small contrast ratio, since flickering is not conspicuous, and the disadvantages of the frame modulation method does not much affect the displayed image, the frame modulation method is very effective.

(14) The aforementioned active matrix type liquid crystal display device is preferably configured so as to increase the ostensible displayed gray scales with a dither method.

The aforementioned liquid crystal display device also enables more half-tones to be displayed than the gray scales corresponding to the number of the divided subpixels.

As described above, according to the area gray scale display method, since the pitches for the driving circuit, the pixel switches, etc. are decreased in accordance with the number of the subpixels, the number of the subpixels is limited, and thereby the number of the gray scales is limited. Therefore, if an image having more gray scales is to be displayed, the use of a dither method, which is a kind of pseudo gray scale display method, is effective. It is expected that the use will increase the number of gray scales corresponding to one to two bits. As will be described later, the gray scales that are really displayed are slightly less than these figures. For example, when a pixel is divided into three subpixels (corresponding to $8^3$=512 colors with an ordinary display method), 3375 (=$15^3$) colors can be displayed with dither of two pixels, and 24389 (=$29^3$) colors can be displayed with dither of four frames.

When the liquid crystal display device has a relatively small pixel pitch, since the decrease in the resolution is not conspicuous, the dither method is very effective.

(15) The aforementioned active matrix type liquid crystal display device is preferably configured so that the polycrystal silicon thin film transistors are formed on a glass substrate in processing in which the highest temperature does not exceed 600° C.

With the liquid crystal display device, the aforementioned liquid crystal display device can be formed on a cheap glass substrate, greatly reducing the manufacturing cost.

The polycrystal silicon thin film transistors can be formed in processing in which the highest temperature does not exceed 600° C. with, for example, laser radiation or ion-doping techniques. Meanwhile, the glass substrate has been improved recently, and some glass substrates having a deformation point higher than 600° C. are now being manufactured. Therefore, it is now possible to form the data signal line driving circuit, the scanning signal line driving circuit, and the pixel switches on a glass substrate that is cheaper than a quartz substrate and that has a large area in a single step. In this manner, the manufacturing cost of the liquid crystal display device integrated with a driving circuit can be reduced, and a large-scale liquid crystal display device can be manufactured.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An active matrix type liquid crystal display device, comprising:
   a plurality of data signal lines arranged in one direction;
   a plurality of scanning signal lines arranged in a direction crossing the plurality of data signal lines;
   a plurality of pixels provided in a matrix form and connected to the plurality of data signal lines and to the plurality of scanning signal lines;
   a data signal line driving circuit for supplying binary image signals to the plurality of data signal lines; and
   a scanning signal line driving circuit for supplying binary scanning signals to the plurality of scanning signal lines,
   wherein the data signal line driving circuit and the scanning signal line driving circuit are composed of polycrystal silicon thin film transistors that are formed on the same substrate as are the plurality of pixels,
   wherein each of the plurality of pixels is composed of a plurality of subpixels, each subpixel including a switching element controlled by one of binary scanning signals,
   wherein the subpixels in the same pixel correspond to a single color and are driven by different binary image signals, and
   wherein the data signal line driving circuit includes:
      scanning circuit;
      a plurality of latch-in circuits for sequentially latching in image data in synchronization with an output pulse of each stage of the scanning circuit; and
      a plurality of outputting circuits for outputting the image data to the plurality of data signal lines as the binary image signals during a horizontal blanking, period.

2. The active matrix type liquid crystal display device as defined in claim 1,
   wherein the plurality of data signal lines respectively corresponding to the plurality of subpixels composing the pixels that are arranged in a direction along which the data signal lines extend are connected to the data signal line driving circuit so as to have an average pitch not exceeding 50 $\mu$m.

3. The active matrix type liquid crystal display device as defined in claim 1,
   wherein the data signal line driving circuit is disposed along only one side of a pixel array composed of the plurality of pixels.

4. The active matrix type liquid crystal display device as defined in claim 1,
   wherein the data signal line driving circuit is disposed along a first side of a pixel array composed of the plurality of pixels,
   the active matrix type liquid crystal display device further comprising
      another data signal line driving circuit disposed along a second side opposite to the first side of the pixel array,
      wherein half the plurality of data signal lines are connected to the data signal line driving circuit, and the rest are connected to the other data signal line driving circuit.

5. The active matrix type liquid crystal display device as defined in claim 4,
   wherein each subpixel has a display electrode for applying to liquid crystal a voltage that is in accordance with the binary image signals, the number of subpixels in each of the plurality of pixels is six, the electrode area ratio of the six subpixels is 1:2:4:8:16:32, the plurality of pixels are divided into groups of three pixels that respectively correspond to red, green and blue colors, and the active matrix type liquid crystal display device carries out color display by constituting one picture element with the three pixels.

6. The active matrix type liquid crystal display device as defined in claim 1,
   further comprising an opposite electrode disposed to oppose the plurality of pixels and alternate-current-driven with the same amplitude as that of a driving voltage for liquid crystal,
   wherein the data signal line driving circuit is composed of a logical circuit.

7. The active matrix type liquid crystal display device as defined in claim 6,
   wherein the polarity of the image data inputted into the data signal line driving circuit is inverted in synchronization with a period of inversion of the polarity of the voltage applied to the liquid crystal, and a signal corresponding to the period of the inversion of the polarity is not inputted into the plurality of outputting circuits.

8. The active matrix type liquid crystal display device as defined in claim 1,
   wherein driving voltages for the scanning circuit and the plurality of latch-in circuits are higher than the voltage of the image data outputted to the plurality of data signal lines, and the outputting circuit includes an inverter driven by a lower voltage than the driving voltages for the scanning circuit and the plurality of latch-in circuits.

9. The active matrix type liquid crystal display device as defined in claim 1,
   wherein the plurality of subpixels in each of the plurality of pixels are arranged in the direction in which the plurality of data signal lines are arranged.

10. The active matrix type liquid crystal display device as defined in claim 1,
   wherein the latch-in circuits have an input capacity that is small, but sufficiently large to store the image data at least until the end of the horizontal blanking period.

11. The active matrix type liquid crystal display device as defined in claim 1,
   wherein the active matrix type liquid crystal display device has a display contrast ratio not exceeding 15:1, and the polarity of the binary image signals applied to the plurality of subpixels is inverted for every frame.

12. The active matrix type liquid crystal display device as defined in claim 1, wherein the:
   switching element of each subpixel is composed of a polycrystal silicon thin film transistor provided on the substrate, the switching element selectively transmitting the binary image signals written onto a corresponding one of the plurality of data signal lines; and
   wherein each subpixel further includes:
      a reflection electrode, disposed so as to cover the corresponding switching element, for applying to liquid crystal a voltage that is in accordance with the binary image signals selectively transmitted by the corresponding switching element and for reflecting radiating light.

13. The active matrix type liquid crystal display device as defined in claim 1, wherein the:
   switching element of each subpixel is composed of a polycrystal silicon thin film transistor provided on the substrate, the switching element selectively transmitting binary image signals written onto a corresponding one of the plurality of data signal lines;
   wherein each subpixel further includes:
      a reflection electrode, disposed so as to cover the corresponding switching element, for applying to liquid crystal a voltage that is in accordance with the binary image signals selectively transmitted by the corresponding switching element and for reflecting radiating light; and
      wherein the polarity of the binary image signals applied to the plurality of subpixels is inverted for every frame.

14. The active matrix type liquid crystal display device as defined in claim 1,
   wherein each subpixel has a display electrode for applying to liquid crystal a voltage that is in accordance with the binary image signals,
   wherein each subpixel in each of the pixels has an electrode area ratio of 2:1 to a subpixel, in the same pixel, having the next largest electrode area.

15. The active matrix type liquid crystal display device as defined in claim 1,
   wherein the number of subpixels in each of the plurality of pixels is three.

16. The active matrix type liquid crystal display device as defined in claim 1,
   wherein the plurality of pixels are divided into groups of three pixels that respectively correspond to red, green and blue colors, and the active matrix type liquid crystal display device carries out color display by constituting one picture element with the three pixels.

17. The active matrix type liquid crystal display device as defined in claim 1,
   wherein each of subpixel has a display electrode for applying to liquid crystal a voltage that is in accordance with the binary image signals, the number of subpixels in each of the plurality of pixels is three, the electrode area ratio of the three subpixels is 1:2:4, the plurality of pixels are divided into groups of three pixels that respectively correspond to red, green and blue colors, and the active matrix type liquid crystal display device carries out color display by constituting one picture element with the three pixels.

18. The active matrix type liquid crystal display device as defined in claim 1,
wherein the data signal line driving circuit is disposed along a first side of a pixel array composed of the plurality of pixels,
the active matrix type liquid crystal display device further comprising:
another data signal line driving circuit disposed along a second side opposite to the first side of the pixel array,
wherein the subpixel corresponding to a digital image data inputted into the data signal line driving circuit differs from the subpixel corresponding to a digital image data inputted into the other data signal line driving circuit.

19. The active matrix type liquid crystal display device as defined in claim 18,
wherein the data signal line driving circuit is connected to the plurality of data signal lines corresponding to upper half bits of each of the plurality of pixels, and the other data signal line driving circuit is connected to the plurality of data signal lines corresponding to lower half bits of each of the plurality of pixels.

20. The active matrix type liquid crystal display device as defined in claim 1,
wherein the active matrix type liquid crystal display device increases ostensible displayed gray scales with a frame modulation method.

21. The active matrix type liquid crystal display device as defined in claim 1,
wherein the active matrix type liquid crystal display device increases ostensible displayed gray scales with a dither method.

22. The active matrix type liquid crystal display device as defined in claim 1,
wherein the polycrystal silicon thin film transistor is formed on a glass substrate in processing in which the highest temperature does not exceed 600° C.

23. An active matrix liquid crystal display device, comprising:
a first substrate;
a scanning signal line driving circuit formed on the first substrate;
a data signal line driving circuit formed on the first substrate;
scanning signal lines supplied with binary scanning signals generated by the scanning signal line driving circuit;
data signal lines supplied with binary image signals generated by the data signal line driving circuit;
a row and column array of pixels formed on the first substrate, each pixel comprising a plurality of subpixels and each subpixel comprising a subpixel electrode and a switching element having a first terminal connected to one of the data signal lines, a second terminal connected to the subpixel electrode, and a control terminal connected to one of the scanning signal lines;
a second substrate arranged so that an electrode formed thereon is opposed to the subpixel electrodes formed on first substrate; and
a liquid crystal layer disposed between the electrode on the second substrate and the subpixel electrodes on the first substrate,
wherein the first terminals of the switching elements of the subpixels in the same pixel are connected to different data signal lines and the control terminals of the switching elements of the subpixels in the same pixel are connected scanning signal line,
wherein each pixel and the subpixels of that pixel correspond to a single color, and
wherein the data signal line driving circuit includes:
a scanning circuit;
a plurality of latch-in circuits for sequentially latching in image data in synchronization with an output pulse of each stage of the scanning circuit; and
a plurality of outputting circuits for outputting the image data to the plurality of data signal lines as the binary image signals during a horizontal blanking period.

24. The active matrix type liquid crystal display device as defined in claim 23, wherein the data signal line driving circuit comprises a first data signal line driving circuit portion arranged on one side of the row and column array of pixels and a second data signal line driving circuit portion arranged on another, opposite side of the row and column array of pixels.

25. The active matrix liquid crystal display device as defined in claim 23, wherein the subpixel electrodes in the same pixel are spaced apart from each other in the column direction.

26. The active matrix liquid crystal display device as defined in claim 23, wherein each pixel comprises three subpixel electrodes.

27. The active matrix liquid crystal display device as defined in claim 23, wherein the ratio of the areas of the subpixel electrodes in the same pixel is $1:2^1: \ldots :2^n$, where n is the number of sub-pixels.

28. The active matrix type liquid crystal display device as defined in claim 23, wherein said outputting circuits are arranged in correspondence with the latch-in circuits and each outputting circuit comprises:
a polarity inverting circuit configured to selectively invert the image data from a corresponding one of the latch-in circuits in accordance with a frame signal; and
a buffer circuit configured to output the image data from a corresponding one of the polarity inverting circuits to a corresponding one of the data signal lines as one of the binary image signals.

29. The active matrix type liquid crystal display device as defined in claim 23, wherein the polarity of the binary image signals supplied to the data signal lines is inverted every frame period.

30. The active matrix type liquid crystal display device as defined in claim 23, wherein the subpixel electrodes are reflective electrodes.

31. The active matrix type liquid crystal display device as defined in claim 23, wherein the pixels are organized into picture elements each comprising a plurality of pixels.

32. An active matrix type liquid crystal display device, comprising:

a plurality of data signal lines arranged in one direction;

a plurality of scanning signal lines arranged in a direction crossing the plurality of data signal lines;

a plurality of pixels provided in a matrix form and connected to the plurality of data signal lines and to the plurality of scanning signal lines;

a data signal line driving circuit for supplying binary image signals to the plurality of data signal lines;

a scanning signal line driving circuit for supplying binary scanning signals to the plurality of scanning signal lines; and an opposite electrode disposed to oppose the plurality of pixels and alternate-current-driven with the same amplitude as that of a driving voltage for liquid crystal, wherein the data signal line driving circuit and the scanning signal line driving circuit are composed of polycrystal silicon thin film transistors that are formed on the same substrate as are the plurality of pixels, wherein each of the plurality of pixels is composed of a plurality of subpixels, each subpixel including a switching element controlled by one of binary scanning signals, wherein the subpixels in the same pixel correspond to a single color and are driven by different binary image signals, and wherein the data signal line driving circuit includes:
  a scanning circuit;
  a plurality of latch-in circuits for sequentially latching in image data in synchronization with an output pulse of each stage of the scanning circuit; and
  a plurality of outputting circuits for outputting the image data to the plurality of data signal lines as the binary image signals during a horizontal blanking period, wherein driving voltages for the scanning circuit and the plurality of latch-in circuits are higher than the voltage of the image data outputted to the plurality of data signal lines, and the outputting circuit includes an inverter composed of a logical circuit driven by a lower voltage than the driving voltages for the scanning circuit and the plurality of latch-in circuits.

* * * * *